(12) United States Patent
Siomina et al.

(10) Patent No.: US 9,026,140 B2
(45) Date of Patent: May 5, 2015

(54) SECOND NODE, POSITIONING NODE AND METHODS THEREIN

(71) Applicant: Telefonaktiebolaget L M Ericsson (Publ), Stockholm (SE)

(72) Inventors: Iana Siomina, Solna (SE); Robert Baldemair, Solna (SE); Muhammad Kazmi, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 57 days.

(21) Appl. No.: 13/861,276

(22) Filed: Apr. 11, 2013

(65) Prior Publication Data

US 2014/0106774 A1    Apr. 17, 2014

Related U.S. Application Data

(60) Provisional application No. 61/713,265, filed on Oct. 12, 2012.

(51) Int. Cl.
*H04W 64/00* (2009.01)
*H04W 48/16* (2009.01)
*G01S 5/02* (2010.01)

(52) U.S. Cl.
CPC .............. *H04W 64/00* (2013.01); *H04W 48/16* (2013.01); *G01S 5/0221* (2013.01)

(58) Field of Classification Search
CPC ... H04W 16/26; H04W 84/047; H04W 24/00; H04W 28/04; H04W 64/00
USPC ........................... 455/69, 456.1, 456.5, 456.6
See application file for complete search history.

(56) References Cited

U.S. PATENT DOCUMENTS

| | | | |
|---|---|---|---|
| 8,406,787 | B2 | 3/2013 | Kangas et al. |
| 2002/0094824 | A1 | 7/2002 | Kennedy, Jr. et al. |
| 2004/0132466 | A1 | 7/2004 | Kennedy, Jr. |
| 2006/0009236 | A1 | 1/2006 | Bose et al. |
| 2008/0026733 | A1 | 1/2008 | Jaatinen |

(Continued)

FOREIGN PATENT DOCUMENTS

| | | |
|---|---|---|
| WO | WO 2010/069610 A1 | 6/2010 |
| WO | WO 2011/136711 A1 | 11/2011 |

(Continued)

OTHER PUBLICATIONS

NTT Docomo: "UE Capability bits for Non-Contiguous Resource Allocation"; Partnership Project (3GPP); Mobile Competence Centre; Feb. 16, 2011; 2 pages.

(Continued)

*Primary Examiner* — Sam Bhattacharya

(57) ABSTRACT

Some embodiments herein disclose a method in a second node (12,13) for performing a positioning measurement on at least uplink signals transmitted by a wireless device (10) served by a first node (12) in a wireless communication network (1). The second node (12,13) obtains information related to a non-contiguous uplink configuration associated with a carrier frequency, wherein the non-contiguous uplink configuration further comprises one or more multi-cluster uplink transmissions from the wireless device (10). Furthermore, the second node (12,13) performs a positioning measurement on at least signals transmitted by the wireless device (10) in the one or more multi-cluster transmissions determined based on the obtained information.

38 Claims, 11 Drawing Sheets

(56) References Cited

U.S. PATENT DOCUMENTS

| | | |
|---|---|---|
| 2010/0020852 A1* | 1/2010 | Erell et al. ............... 375/141 |
| 2010/0222068 A1 | 9/2010 | Gaal et al. |
| 2012/0040687 A1 | 2/2012 | Siomina et al. |
| 2012/0052875 A1 | 3/2012 | Kangas et al. |
| 2013/0040673 A1 | 2/2013 | Siomina et al. |
| 2014/0066094 A1 | 3/2014 | Siomina et al. |
| 2014/0077356 A1 | 3/2014 | Siomina et al. |
| 2014/0133477 A1 | 5/2014 | Siomina et al. |

FOREIGN PATENT DOCUMENTS

| | | |
|---|---|---|
| WO | WO 2011/142715 A1 | 11/2011 |
| WO | WO 2012/099515 A1 | 7/2012 |
| WO | WO 2012/154106 A1 | 11/2012 |
| WO | WO 2012/173561 A2 | 12/2012 |

OTHER PUBLICATIONS

ST-Ericsson/Ericsson: "Non-Contiguous Carrier Aggregation Configurations"; (3GPP); Mobile Competence Centre; Jun. 22, 2011; 5 pages.

NTT Docomo: "Further Studies on Capability Bites for Non-Contiguous RA"; (3GPP); Mobile Competence Centre; Feb. 16, 2011; 6 pages.

3GPP; $3^{rd}$ Generation Partnership Project; Technical Specification Group Radio Access Network; Evolved Universal Terrestrial Radio Access (E-UTRA); Physical Layer; Measurements; (Release 10); (3GPP) TS 36.214, V10.1.0, Mar. 2011; 13 pages.

Huawei: "Understanding on Type 1 and Type 2 Relay"; R1-091803; (3GPP); TSG RAN WG1 meeting #57; May 3-8, 2009; San Francisco, USA; 4 pages.

Ericsson et al.: "Acquiring synch in CA-based HetNet Operations"; (3GPP); TSG-RAN1 Meeting #65; V. 10.1.0; May 13-19, 2011; Barcelona, Spain; 3 pages.

Huawei et al.: "The Multiple Time Advances in Carrier Aggregation"; (3GPP); TSG-RAN WG2 Meeting #73bis; Apr. 11-15, 2011; Shanghai, China; 4 pages.

Renesas Mobile Europe: "Discussion on RACH based solution and Timing difference based solution"; (3GPP); TSG-RAN WG2 Meeting #74; May 9-13, 2011; Barcelona, Spain; 4 pages.

Alcatel-Lucent, et al.: "Technology Issues for Heterogeneous Network for LTE-A"; R1-093788; No. Miyazaki; Oct. 12, 2009; XP050388306.

3GPP; $3^{rd}$ Generation Partnership Project; Technical Specification Group Services and System Aspects, Functional stage 2 description of Location Services (LCS); (3GPP) TS 23.271, V10.2.0; Release 10; Mar. 28, 2011; 169 pages.

3GPP; $3^{rd}$ Generation Partnership Project; Technical Specification Group Radio Access Network; Evolved Universal Terrestrial Radio Access (E-UTRA); Stage 2 functional specification of User Equipment (UE) positioning in E-UTRAN; (3GPP) TS 36.305 V11.0.0; Jul. 2, 2012; 56 pages.

3GPP; $3^{rd}$ Generation Partnership Project; Technical Specification Group Radio Access Network; Evolved Universal Terrestrial Radio Access (E-UTRA); LTE Positioning Protocol (LPP); Release 10; (3GPP) TS 36.355 V10.5.0; Jul. 2, 2012; 116 pages.

3GPP; $3^{rd}$ Generation Partnership Project; Technical Specification Group Core Network and Terminals, Location Services (LCS); LCS Application Protocol (LCS-AP) between the Mobile Management Entity (MME) and Evolved Serving Mobile Location Centre (E-SMLC); SLs interface; Release 11; (3GPP) TS 29.171 V11.1.0; Mar. 22, 2012; 51 pages.

3GPP; $3^{rd}$ Generation Partnership Project; Technical Specification Group Radio Access Network, Evolved Universal Terrestrial Radio Access Network (E-UTRAN); Architecture Description; Release 10; (3GPP) TS 36.401 V10.4.0; Jul. 2, 2012; 20 pages.

3GPP TSG-RAN WG2 Meeting #78, R2-122116; Prague, Czech Republic; May 21-25, 2012; Change Request; 20 pages.

3GPP; 3rd Generation Partnership Project; Technical Specification Group Services and System Aspects; Network Sharing, Architecture and functional description; (3GPP) TS 23.251 V11.1.0; Release 11; Mar. 2012; 28 pages.

3GPP; 3rd Generation Partnership Project; Technical Specification Group Core Network and Terminals, Location Services (LCS), LCS Application Protocol (LCS-AP) between the Mobile Management Entity MME) and Evolved Serving Mobile Location Centre (E-SMLC), SLs interface; (3GPP) TS 29.171 V9.2.0; Release 9; Sep. 2010; 51 pages.

3GPP; 3rd Generation Partnership Project; Technical Specification Group Radio Access Network, Evolved Universal Terrestrial Radio Access (E-UTRA), LTE Positioning Protocol (LPP); (3GPP) TS 36.355 V9.1.0; Release 9; Mar. 2010; 111 pages.

UserPlane Location Protocol; Candidate Version 2.0, Open Mobile Alliance OMA-TS-ULP-V2_0-20110527-C; May 27, 2011; 410 pages.

3GPP; 3rd Generation Partnership Project; Technical Specification Group Radio Access Network, Evolved Universal Terrestrial Radio Access (E-UTRA), LTE Positioning Protocol (LPP); (3GPP) TS 36.355 V10.4.0; Release 10; Dec. 2011; 116 pages.

3GPP; 3rd Generation Partnership Project; Technical Specification Group Core Network and Terminals, Location Services (LCS), LCS Application Protocol (LCS-AP) between the Mobile Management Entity MME) and Evolved Serving Mobile Location Centre (E-SMLC), SLs interface; (3GPP) TS 29.171 V10.3.0; Release 10; Jun. 2011; 51 pages.

* cited by examiner

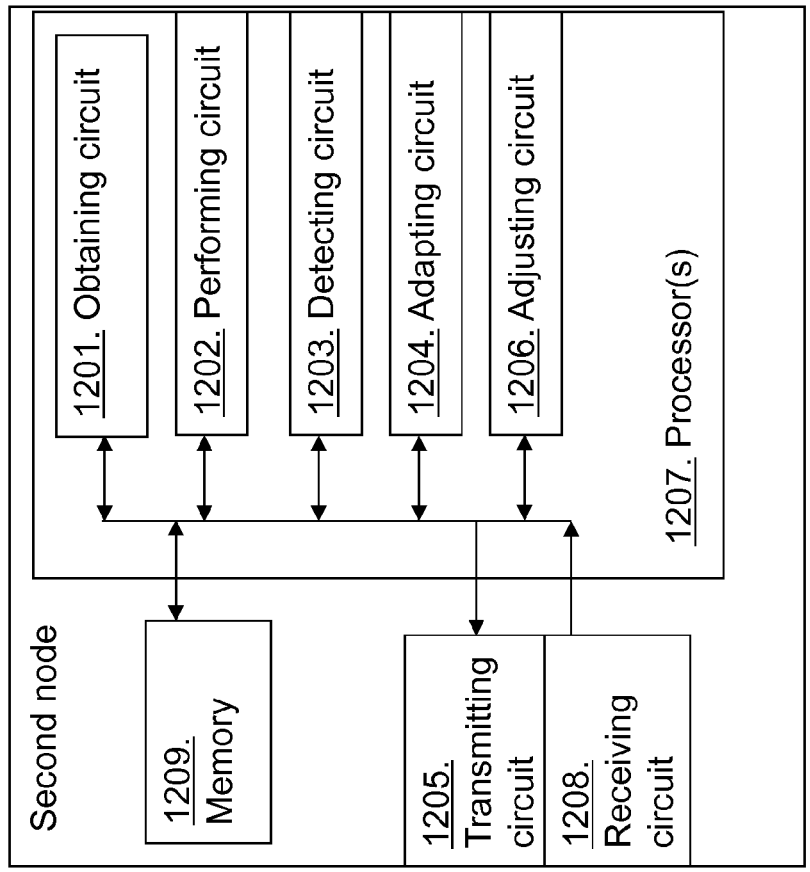
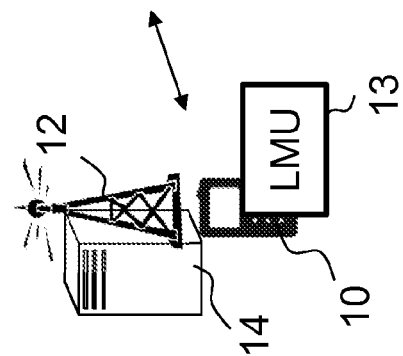
Fig. 12

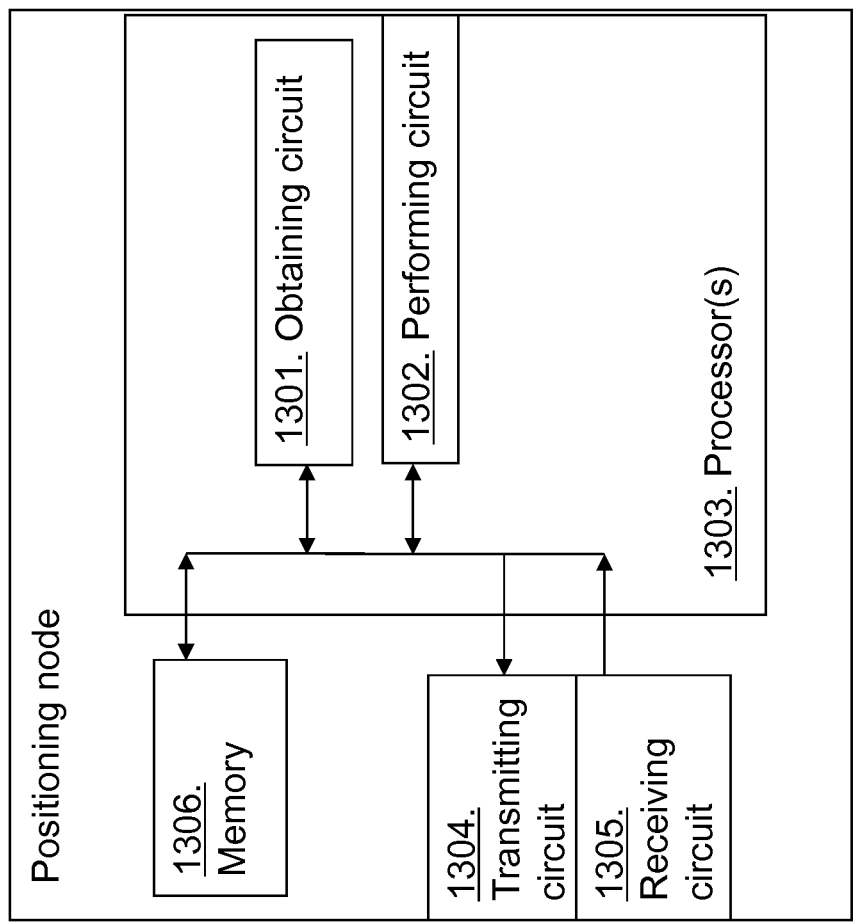
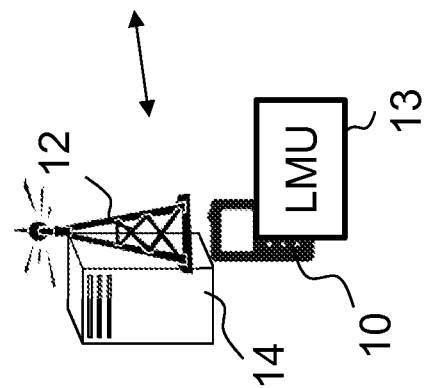
Fig. 13

SECOND NODE, POSITIONING NODE AND METHODS THEREIN

CROSS-REFERENCE TO RELATED APPLICATION

This application claims the benefit of U.S. Provisional Patent Application 61/713,265 filed Oct. 12, 2012.

TECHNICAL FIELD

Embodiments herein relate to a second node, a positioning node and methods therein. In particular, some embodiments herein relate to performing a positioning measurement a wireless communication network.

BACKGROUND

In a typical radio communications network, wireless terminals, also known as mobile stations and/or user equipments (UEs), communicate via a Radio Access Network (RAN) to one or more core networks. The radio access network covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the user equipments within range of the base stations.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the $3^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network (RAN) of an EPS has an essentially "flat" architecture comprising radio base station nodes without reporting to RNCs.

UL Transmissions in LTE

In the current LTE standard, UL signal transmissions comprise uplink physical channel transmissions and uplink physical signal transmissions. A physical channel typically corresponds to a set of resource elements carrying information originating from higher layers. Example uplink physical channels: Physical Uplink Shared Channel (PUSCH), Physical Uplink Control Channel (PUCCH), Physical Random Access Channel (PRACH). An uplink physical signal is used by the physical layer but typically does not carry information originating from higher layers. Example uplink physical signals are reference signal, of which there currently two types defined in LTE: Demodulation Reference Signal (DMRS) associated with transmission of PUSCH or PUCCH, and Sounding reference signal (SRS), not associated with transmission of PUSCH or PUCCH.

Dynamically Scheduled UL Transmissions

In the LTE uplink, E-UTRAN can dynamically allocate resources to user equipments at each Transmission Time Interval (TTI) with a 1 ms granularity via the Cell Radio Network Temporary Identifier (C-RNTI) on Physical Downlink Control Channel(s) (PDCCH). A user equipment always monitors the PDCCH(s) in order to find possible allocation for uplink transmission when its downlink reception is enabled, activity governed by Discontinuous Reception (DRX) when configured. When carrier aggregation is configured, the same C-RNTI applies to all serving cells.

A user equipment receives in subframe an UL grant and transmits in the UL in subframe n+k with k=4 for Frequency-Division Duplexing (FDD); in Time-Division Duplexing (TDD) k is more complicated and specified via table 8-2 in 36.213 v. 11.0.0. The UL grant contains parameters that are needed to describe the UL transmission so that a receiver is capable of decoding the transmission. Among others, the parameters contained in UL grant are: frequency hopping flag, resource block assignment, power control command for PUSCH, SRS request, resource allocation type, e.g., multi-cluster transmissions, modulation and coding scheme, cyclic shift and orthogonal cover code for DMRS. For a complete list of parameters, see Section 5.3.3.1.1 in TS 36.312 v.11.0.0. An UL grant for a multi-antenna transmission contains in addition Modulation and Coding Scheme (MCS) for a second transport block and precoding information, see Section 5.3.3.1.8 in TS 36.212, v. 11.0.0.

In LTE, UL grants are transmitted in Downlink Control Information (DCI) formats 0, for single-antenna transmissions, and 4 for multi-antenna transmissions.

UL grants can either be transmitted on PDCCH or on enhanced PDCCH (ePDCCH). ePDCCH is a new control channel that is introduced in Rel-11. ePDCCH does not rely on cell-specific reference signals but on UE specific reference signals. Advantages of ePDCCH over PDCCH are among other improved interference mitigation and beamforming possibilities.

Semi-persistent UL Transmissions

For small UL transmissions—a typical example is Voice over IP (VoIP)—the PDCCH overhead for UL grants required for each UL transmission can become rather large. Therefore, E-UTRAN can allocate a semi-persistent uplink resource for the first Hybrid Automatic Repeat Request (HARQ) transmissions and potentially retransmissions to user equipments:

Radio Resource Control (RRC) defines the periodicity, any of: 10, 20, 32, 40, 64, 80, 128, 160, 320, or 640 subframes, of the semi-persistent transmissions, PDCCH indicates whether the uplink grant is a semi-persistent one i.e. whether it can be implicitly reused in the following TTIs according to the periodicity defined by RRC.

Hence, with a special DCI format 0 transmission, Semi-Persistent Scheduling (SPS) activation, semi-persistent scheduling is started once it has been configured. Which resources to use in the first semi-persistent transmission follows from the SPS activation grant. Resources used for subsequent semi-persistent transmissions are the same as in the original transmission, except subframe, subframes for subsequent transmissions are derived from the first transmission time together with the RRC configured periodicity.

The semi-persistent UL scheduling configuration provided via RRC may also comprise power control parameters and a trigger of two-intervals-Semi-Persistent Scheduling in uplink, for TDD only.

In the sub-frames where the user equipment has semi-persistent uplink resource, if the user equipment cannot find its C-RNTI on the PDCCH(s), an uplink transmission according to the semi-persistent allocation that the UE has been assigned in the TTI can be made. For semi-persistent scheduling, semi-persistent scheduling C-RNTI, a special type of C-RNTI, which is provided to the user equipment via RRC together with the SPS information is used as unique identifiers.

Semi-persistent scheduled UL resources become invalid either if an SPS deactivation PDCCH is received or if the UE does not use the semi-persistent scheduled resources a number of times in a row. The number is configured by RRC and can be one of: 2, 3, 4, or 8 subframes.

SPS activation and deactivation messages can be sent both on PDCCH and ePDCCH.

Multi-cluster UL Transmissions

With carrier aggregation, semi-persistent uplink resources can only be configured for the Primary Cell (PCell) and only PDCCH allocations for the PCell can override the semi-persistent allocation.

In carrier aggregation, the user equipment may transmit over multiple Component Carriers (CC), a.k.a. N-times clustered Discrete Fourier Transform Spread—Orthogonal Frequency-Division Multiplexing (DFTS-OFDM); however, the user equipment may also have a multi-cluster transmission, aka in 3GPP UL resource allocation type 1, within a carrier or Component Carrier (CC) and hereby allowing for non-contiguous allocation of scheduled resource blocks, for PUSCH only, and thus giving more scheduling flexibility in frequency domain for UL e.g., enabling more flexible frequency-selective scheduling in UL. The number of clusters is limited to two in LTE in the current specification.

The multi-cluster technique, however, produces a peakier signal, i.e. its associated cubic metric, measure for peakyness, is increased resulting in a larger required power back-off at the user equipment.

FIG. 1 discloses a Multi-cluster UL transmission vs. a multi-carrier transmission. Multi-cluster transmission is configured as Type 1 resource allocation, see e.g. subclause 8.1.2 in TS 36.213 v. 11.0.0. Currently, two resource allocation schemes Type 0, contiguous allocation, and Type 1, multi-cluster allocation, are supported for PDCCH/ePDCCH with uplink DCI format. The use of Type 1 resource allocation is configured via RRC. Even if Type 1 resource allocation is configured, Type 0 resource allocation is always available as fallback solution.

UE Capabilities Associated with Multi-cluster Transmission

The 3GPP standard, sections 4.3.4.13 and 4.3.4.14 in TS 36.306 v.11.0.0, defines the following two UE capabilities associated with multi-cluster transmissions:

multiClusterPUSCH-WithinCC: UE baseband support of multi-cluster PUSCH transmission within a component carrier, this is a band-agnostic capability, nonContiguousUL-RA-WithinCC-Info: UE RF support of non-contiguous UL resource allocations within a component carrier; this field is signaled per E-UTRA radio frequency band and indicates in which bands the user equipment supports non-contiguous UL resource allocation, the indicators are listed in the same order as in supportedBandListEUTRA.

The user equipment supporting multi-cluster transmissions should have both capabilities described above.

The two capabilities above are signaled over RRC from the user equipment to the radio base station.

```
PhyLayerParameter-v1020 ::=             SEQUENCE {
    twoAntennaPortsForPUCCH-r10         ENUMERATED
{supported}              OPTIONAL,
    tm9-With-8Tx-FDD-r10                ENUMERATED
{supported}              OPTIONAL,
    pmi-Disabling-r10                   ENUMERATED
{supported}              OPTIONAL,
    crossCarrierScheduling-r10          ENUMERATED
{supported}              OPTIONAL,
    simultaneousPUCCH-PUSCH-r10         ENUMERATED
{supported}              OPTIONAL,
    multiClusterPUSCH-WithinCC-r10      ENUMERATED
{supported}              OPTIONAL,
    nonContiguousUL-RA-WithinCC-List-r10 NonContiguousUL-
RA-WithinCC-List-r10     OPTIONAL
}
    NonContiguousUL-RA-WithinCC-List-r10 ::=  SEQUENCE
(SIZE (1..maxBands)) OF NonContiguousUL-RA-WithinCC-r10
    NonContiguousUL-RA-WithinCC-r10 ::=       SEQUENCE {
    nonContiguousUL-RA-WithinCC-Info-r10      ENUMERATED
{supported}              OPTIONAL
}
```

Positioning in LTE

The possibility to determine the position of a wireless device has enabled application developers and wireless network operators to provide location based, and location aware, services. Examples of those are guiding systems, shopping assistance, friend finder, presence services, community and communication services and other information services giving the mobile user information about their surroundings.

The three key network elements in an LTE positioning architecture are the Location Services (LCS) Client, the LCS target and the LCS Server. The LCS Server is a physical or logical entity managing positioning for a LCS target device by collecting measurements and other location information, assisting the terminal in measurements when necessary, and estimating the LCS target location. A LCS Client is a software and/or hardware entity that interacts with a LCS Server for the purpose of obtaining location information for one or more LCS targets, i.e. the entities being positioned. LCS Clients may reside in a network node, external node, Public-Safety Answering Point (PSAP), user equipment, radio base station, etc., and they may also reside in the LCS targets themselves. An LCS Client, e.g., an external LCS Client, sends a request to LCS Server, e.g., positioning node, to obtain location information, and LCS Server processes and serves the received requests and sends the positioning result and optionally a velocity estimate to the LCS Client.

Position calculation can be conducted, for example, by a positioning server, e.g. Evolved Serving Mobile Location Centre (E-SMLC) or Service Location Protocol (SLP) in LTE or UE. The latter corresponds to the UE-based positioning mode, whilst the former may be network-based positioning, calculation in a network node based on measurements collected from network nodes such as Location Measurement Units (LMU) or eNodeBs, or UE-assisted positioning, calculation is in a positioning network node based on measurements received from the user equipment.

FIG. 2 illustrates the Uplink-Time Difference of Arrival (UTDOA) architecture being currently discussed in 3GPP. Although UL measurements may in principle be performed by any radio network node, e.g., eNodeB, UL positioning architecture may include specific UL measurement units, e.g., LMUs, which e.g. may be logical and/or physical nodes, may be integrated with radio base stations or sharing some of the software or hardware equipment with radio base stations or may be completely standalone nodes with own equipment (including antennas). The architecture is not finalized yet, but there may be communication protocols between LMU and positioning node, and there may be some enhancements for LTE Positioning Protocol annex (LPPa) or similar protocols to support UL positioning. A new interface, SLm, between the E-SMLC and LMU is being standardized for uplink positioning. The interface is terminated between a positioning server, e.g. E-SMLC, and LMU. It is used to transport SLm interface Application Protocol (SLmAP), a.k.a. LMUp, protocol, new protocol being specified for UL positioning, for which no details are yet available, messages over the E-SMLC-to-LMU interface. Several LMU deployment options are possible. For example, an LMU may be a standalone physical node, it may be integrated into eNodeB or it may be sharing at least some equipment such as antennas with eNodeB—these three options are illustrated in the FIG. 2.

LPPa is a protocol between eNodeB and LCS Server specified only for control-plane positioning procedures, although it still can assist user-plane positioning by querying eNodeBs for information and eNodeB measurements.

In LTE, UTDOA measurements, UL Relative Time of Arrival (RTOA), are performed on Sounding Reference Signals (SRS). To detect an SRS signal, LMU needs a number of SRS parameters to generate the SRS sequence which is to be correlated to received signals. SRS parameters would have to be provided in the assistance data transmitted by positioning node to LMU; these assistance data would be provided via SLmAP, a.k.a. LMUp in some sources. However, these parameters are generally not known to the positioning node, which needs then to obtain this information from eNodeB configuring the SRS to be transmitted by the user equipment and measured by LMU; this information would have to be provided in LPPa or similar protocol.

Positioning Result

A positioning result is a result of processing of obtained measurements, including Cell IDs, power levels, received signal strengths, etc., and it may be exchanged among nodes in one of the pre-defined formats. The signaled positioning result is represented in a pre-defined format corresponding to one of the seven Geographical Area Description (GAD) shapes.

Currently, the positioning result may be signaled between:
LCS target, e.g., UE, and LCS server, e.g. over LPP protocol,
Positioning servers, e.g., E-SMLC and SLP, over standardized or proprietary interfaces,
Positioning server and other network nodes, e.g., E-SMLC and Mobility Managing Entity (MME)/Mobile Switching Centre (MSC)/Gateway Mobile Location Centre (GMLC)/Operations & Maintenance (O&M)/Self-Organizing Network (SON)/Minimisation of Drive Tests (MDT),
Positioning node and LCS Client, e.g., between E-SMLC and PSAP or between SLP and External LCS Client or between E-SMLC and UE.

In emergency positioning, LCS Client may reside in PSAPs.

Positioning result is often based on one or more radio measurements, of the same or different types, e.g., timing measurements such as timing advance and Round Trip Time (RTT) or power-based measurements such as received signal strength, received from measuring radio nodes, e.g., user equipment or eNodeB or LMU.

UTDOA or UL Positioning Measurements

As the name suggests, measurements for UL positioning and UTDOA are performed on UL transmissions, which may comprise, e.g., reference signal transmissions or UL physical channel transmissions.

UL RTOA is the currently standardized UTDOA timing measurement. The measurement may be performed on Sounding Reference Signals (SRS), which may be configured for periodic transmission. SRS transmissions may be triggered by any of the two trigger types:
Trigger type 0: higher layer signaling,
Trigger type 1: DCI formats 0/4/1A for FDD and TDD and DCI formats 2B/2C for TDD.

UL positioning measurement performance may significantly degrade if the measuring node at least in some pre-scheduled measuring occasions tries to perform measurements on a signal which is not transmitted.

For high-quality UL measurements it is important that a measuring node can measure on as many as possible UL signals and signal occurrences. Since the measuring node can often be another node than the scheduling eNodeB, the measuring node may not be aware of scheduling decisions by the serving eNodeB for the transmitting user equipment.

SUMMARY

An object of embodiments herein is to provide a mechanism that improves the accuracy and efficiency of positioning a wireless device in a wireless communications network.

According to an aspect of embodiments herein, the object is achieved by a method in a second node, such as a measuring node e.g. an LMU, a non-serving or a serving radio base station, for performing a positioning measurement on at least uplink signals transmitted by a wireless device served by a first node, such as the serving radio base station, in a wireless communication network. The second node obtains information related to a non-contiguous uplink configuration associated with a carrier frequency. The non-contiguous uplink configuration comprises one or more multi-cluster uplink transmissions from the wireless device. The second node then performs a positioning measurement on at least signals transmitted by the wireless device in the one or more multi-cluster transmissions determined based on the obtained information.

According to another aspect of embodiments herein, the object is achieved by a method in a positioning node for handling information related to uplink transmissions from a wireless device in a wireless communications network. The positioning node obtains information related to: capability of supporting non-contiguous transmissions of the wireless device; non-contiguous configuration currently used by the wireless device; capability to perform non-contiguous uplink measurements of a measuring node; and/or capability to support two or more uplink patterns for the wireless device. The positioning node further takes the obtained information into account when: requesting another network node serving the wireless device to configure the wireless device based on the obtained information; adjusting configuration for performing a measurement; providing to a measuring node the wireless device configuration information or a measurement configuration; and/or selecting a positioning method and/or measurement configuration or measurement type based on the obtained information.

According to yet another aspect of embodiments herein, the object is achieved by a second node for performing a positioning measurement on at least uplink signals transmitted by a wireless device served by a first node in a wireless communication network. The second node comprises an obtaining circuit configured to obtain information related to a non-contiguous uplink configuration associated with a carrier frequency, wherein the non-contiguous uplink configuration further comprises one or more multi-cluster uplink transmissions from the wireless device. The second node further comprises a performing circuit configured to perform a positioning measurement on at least signals transmitted by the wireless device in the one or more multi-cluster transmissions determined based on the obtained information.

According to still another aspect of embodiments herein, the object is achieved by a positioning node for handling information related to uplink transmissions from a wireless device in a wireless communications network. The positioning node comprises an obtaining circuit configured to obtain information related to: capability of supporting non-contiguous transmissions of the wireless device; non-contiguous configuration currently used by the wireless device; capability to perform non-contiguous uplink measurements of a measuring node; and/or capability to support two or more uplink patterns for the wireless device. The positioning node further comprises a performing circuit configured to take the obtained information into account when: requesting another network node serving the wireless device to configure the wireless device based on the obtained information; adjusting configuration for performing a measurement; providing to a measuring node the wireless device configuration information or a measurement configuration; and/or selecting a positioning method and/or measurement configuration or measurement type based on the obtained information.

By performing positioning measurements on signals transmitted by the wireless device in the one or more multi-cluster transmissions determined based on the obtained information, the positioning measurements are accurate and reliable and thus the positioning of the wireless device is efficient and accurate.

BRIEF DESCRIPTION OF THE DRAWINGS

Embodiments will now be described in more detail in relation to the enclosed drawings, in which:

FIG. 12 is a block diagram depicting a second node according to embodiments herein; and FIG. 13 is a block diagram depicting a positioning node according to embodiments herein.

DETAILED DESCRIPTION

Figure 3:
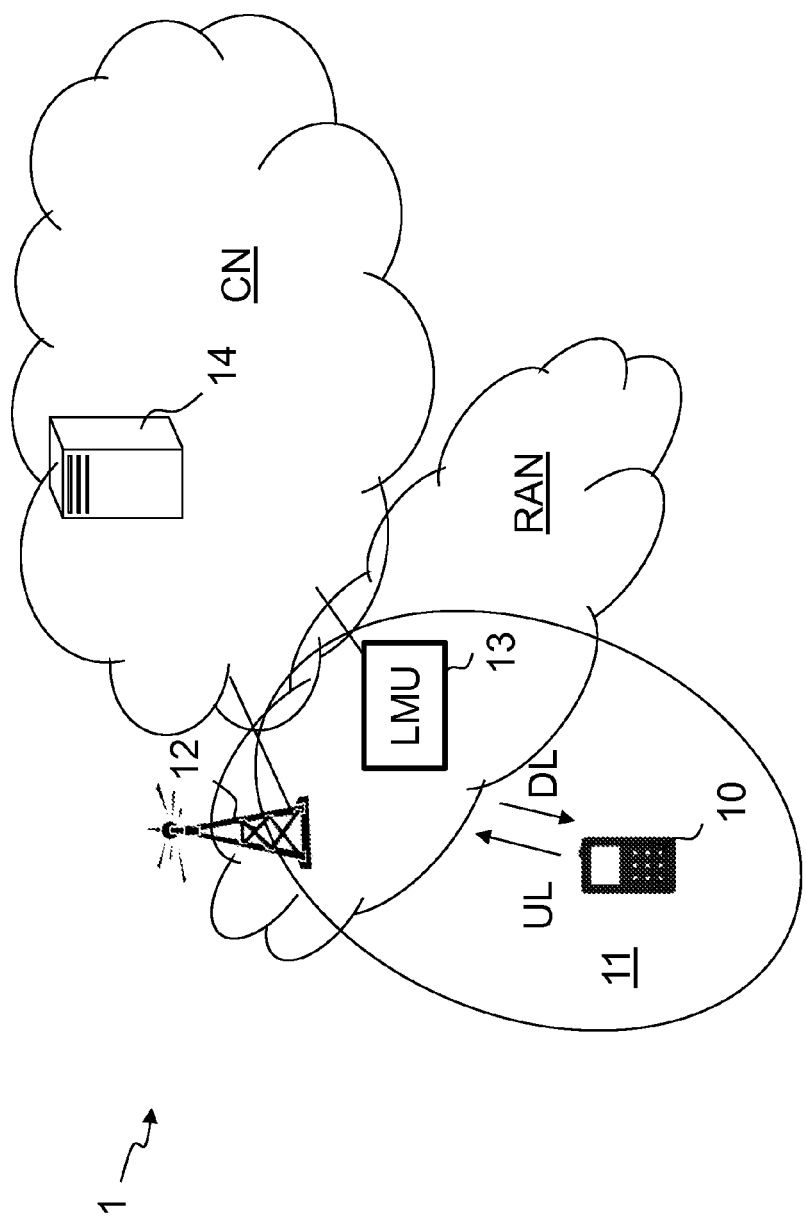
FIG. 3 shows a schematic overview depicting a wireless communications network according to some embodiments disclosed herein.

Embodiments herein relate to wireless communication networks in general and in particular to networks doing positioning measurements. FIG. 3 is a schematic overview depicting a wireless communication network 1. The wireless communication network 1 comprises one or more RANs and one or more CNs. The wireless communication network 1 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The wireless communication network 1 is exemplified herein as an LTE network.

In the wireless communication network 1, a wireless device 10, also known as a mobile station, a user equipment and/or a wireless terminal, communicates via a Radio Access Network (RAN) to one or more core networks (CN). It should be understood by the skilled in the art that "wireless device" is a non-limiting term which means any wireless terminal, user equipment, Machine Type Communication (MTC) device, a Device to Device (D2D) terminal, or node e.g. Personal Digital Assistant (PDA), laptop, mobile, sensor, relay, mobile tablets or even a small base station communicating within respective cell.

The wireless communication network 1 covers a geographical area which is divided into cell areas, e.g. a cell 11 being served by a radio base station 12. The radio base station 12 may also be referred to as a first radio base station and e.g. a NodeB, an evolved Node B (eNB, eNode B), a base transceiver station, Access Point Base Station, base station router, or any other network unit capable of communicating with a user equipment within the cell served by the radio base station depending e.g. on the radio access technology and terminology used. The radio base station 12 may serve one or more cells, such as the cell 11.

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 11 uniquely in the whole wireless communication network 1 is also broadcasted in the cell 11. The radio base station 12 communicates over the air or radio interface operating on radio frequencies with the user equipment 10 within range of the radio base station 12. The user equipment 10 transmits data over the radio interface to the radio base station 12 in Uplink (UL) transmissions and the radio base station 12 transmits data over an air or radio interface to the user equipment 10 in Downlink (DL) transmissions.

Figure 1:
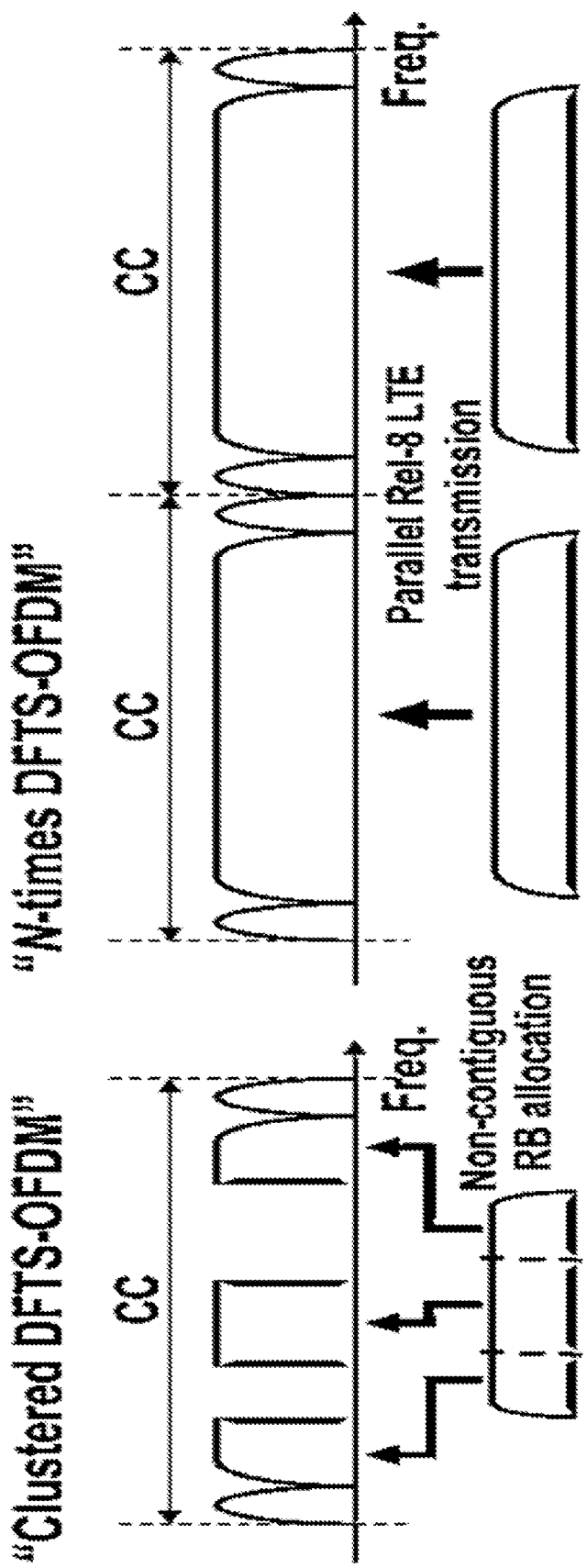
FIG. 1 shows a Multi-cluster UL transmission vs. a multi-carrier transmission.
Figure 2:
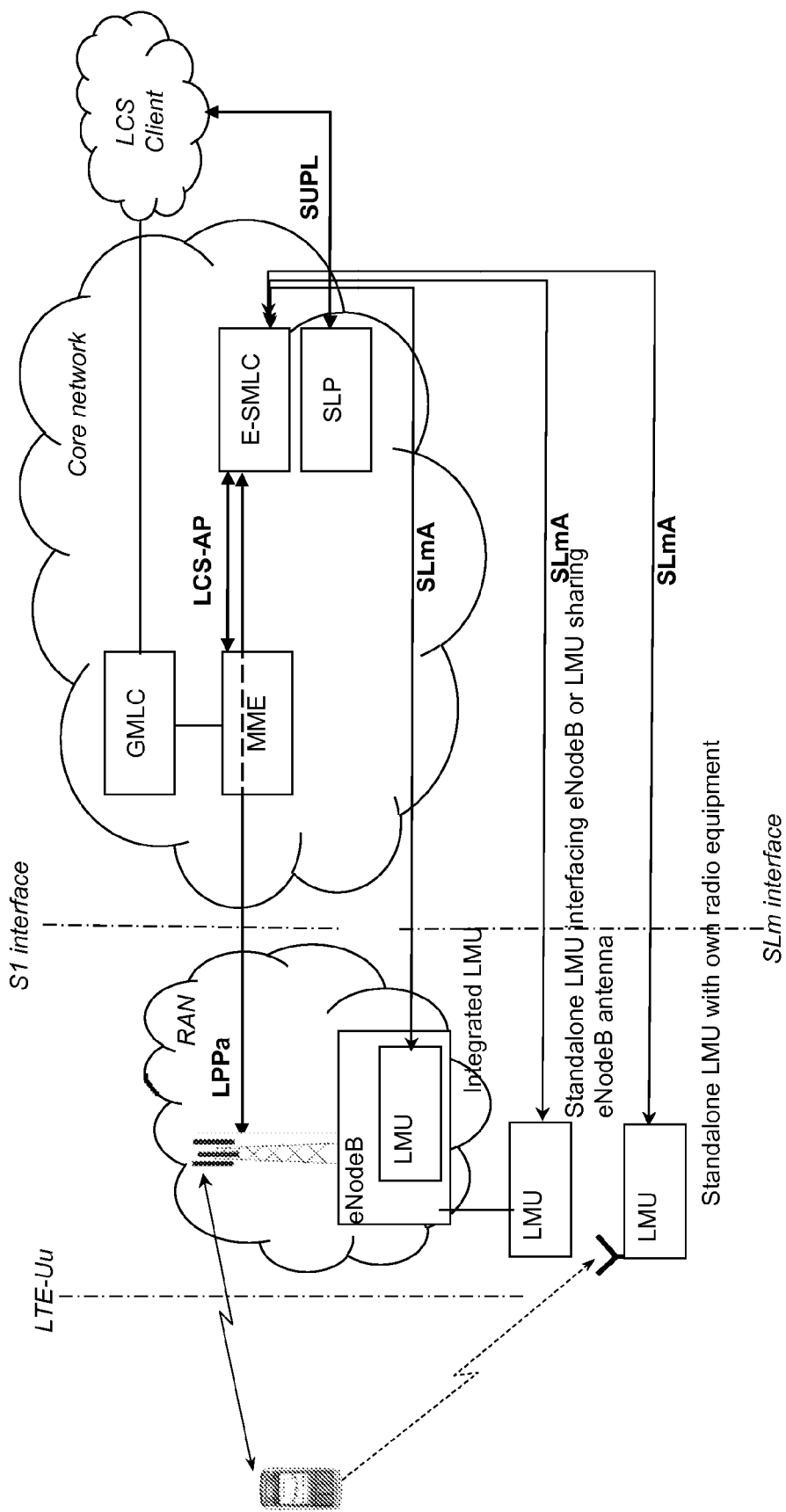
FIG. 2 shows an UL positioning architecture in LTE.

Furthermore, the wireless communication network 1 comprises a Location Measuring Unit (LMU) 13. The LMU 13 is a measuring node configured to perform positioning measurements on transmissions to/from the wireless device 10. It should be understood that the LMU 13 may be standalone node with own radio equipment as illustrated, a stand alone node interfacing the radio base station 12 or node sharing the radio base station 12, or be integrated with the radio base station 12 shown in FIG. 2. It should also be noted that the radio base station 12 may also be referred to as a measuring node.

Furthermore, the radio communications network 1 comprises a core network node such as a positioning server 14, such as an E-SMLC for positioning the wireless device 10. The positioning server is an example of a positioning node, thus, a positioning node herein comprises a positioning server but may also comprise a radio node performing measurements for positioning such as the LMU 13.

The radio node serving the wireless device 10 is herein denoted as a first node. The radio nodes performing positioning measurements are denoted as a second node herein. The second node hence comprises the LMU, the radio base station 12, but also non serving radio base stations.

One possibility to obtain the information about UL signals is to "sniff" control signaling between radio base station 12 and the wireless device 10 and to identify control signaling belonging to the wireless device 10 of interest, e.g., the LMU 13 may try to read the UL scheduling information sent by the radio base station 12 and intended for the wireless device 10. Besides complexity and performance reasons—blind detection of scheduling grants is both very complex and error prone—it may be particularly hard, especially with the newly introduced ePDCCH: If control signaling is transmitted on ePDCCH and beamformed towards the wireless device 10, the LMU 13 may be outside the boresight and cannot receive ePDCCH. The wireless device 10 may be capable of supporting multi-cluster/non-contiguous transmission of UL signals in single carrier operation or on each component carrier in multi-carrier operation. The measuring node and/or wireless device 10 perform positioning measurement on UL signals transmitted by the wireless device 10. The multi-cluster/non-contiguous transmission in the UL may degrade the positioning measurement performed on UL signals when they are transmitted with multi-cluster/non-contiguous transmission. This in turn may lead to increase in the positioning error or even positioning failure. The methods disclosed herein address this problem and disclose methods to enhance positioning measurements when multi-cluster/non-contiguous transmission is used for the wireless device 10.

Embodiments herein relate to a method in the second node, e.g. the LMU 13, for performing a positioning measurement on at least uplink signals transmitted by the wireless device 10 served by the first node, e.g. the radio base station 12, in the wireless communication network 1. In this example, the LMU 13 obtains information related to a non-contiguous uplink configuration associated with a carrier frequency, wherein the non-contiguous uplink configuration further comprises one or more multi-cluster uplink transmissions from the wireless device 10. The LMU 13 then performs a positioning measurement on at least signals transmitted by the wireless device 10 in the one or more multi-cluster transmissions determined based on the obtained information. Furthermore, embodiments herein disclose a method in a positioning node, such as an E-SMLC, the LMU 13 or a node performing positioning measurements on uplink radio signals, the radio base station 12 or similar, for handling information related to uplink transmissions from the wireless device 10. The positioning node obtains information related to capability of one or more of: supporting non-contiguous transmissions of the wireless device 10, non-contiguous configuration currently used by the wireless device 10, capability to perform non-contiguous uplink measurements of a measuring node, e.g. LMU 13 or radio base station 12, and/or capability to support two or more uplink patterns for the wireless device 10. The positioning node then takes the obtained information into account when e.g. requesting another network node, such as the radio base station 12, serving the wireless device 10 to configure the wireless device 10 based on the obtained information, adjusting configuration for performing a measurement, providing, to a measuring node, the wireless device configuration information or a measurement configuration, and/or when selecting a positioning method and/or measurement configuration or measurement type based on the obtained information.

Embodiments herein support UL positioning with multi-cluster UL transmissions, for PUSCH but also for any other UL signal/channel type for which multi-cluster does not even exist in the current LTE standard. Furthermore, embodiments herein report contiguous/non-contiguous measurement capability of the UL positioning measuring node, e.g. the LMU 13, and also the UL positioning measuring node is also herein made aware of the multi-cluster capability of the wireless device 10. In embodiments herein the positioning server 14 or the LMU 13 is made aware of the multi-cluster capability of the wireless device 10 or of the contiguous/non-contiguous measurement capability of the UL positioning measuring node, such as the LMU 13.

Figure 4:
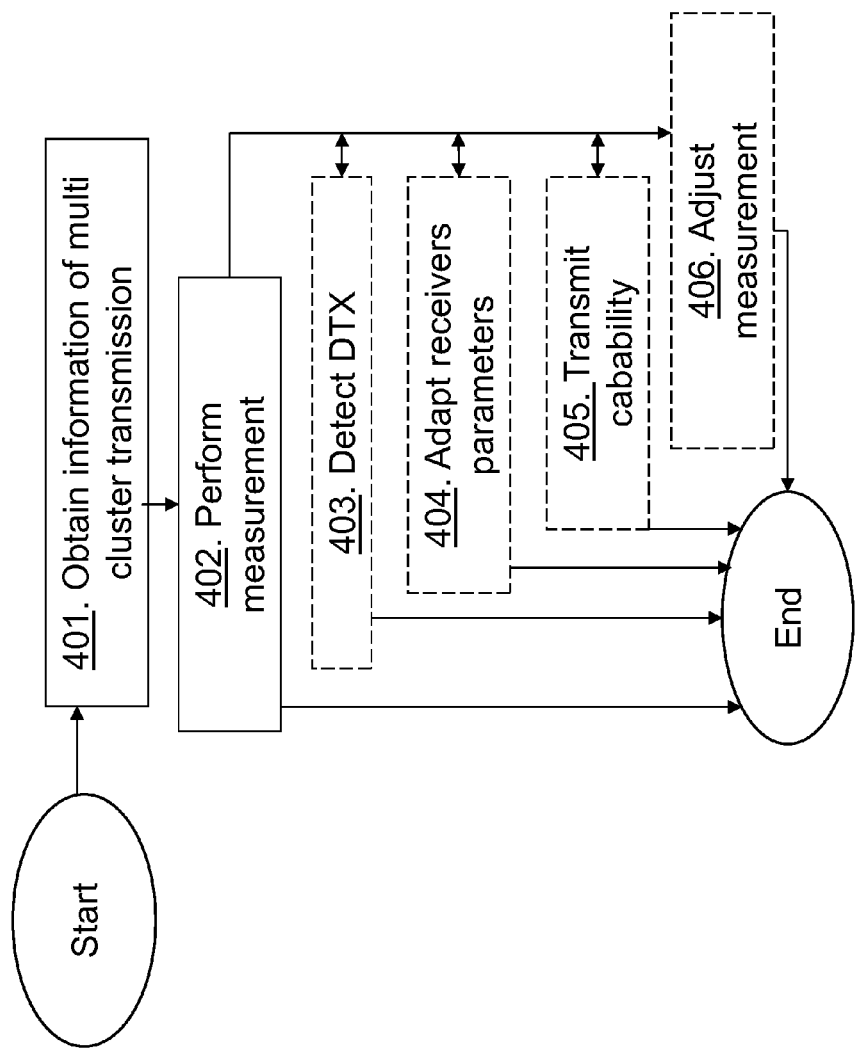
FIG. 4 shows a schematic flowchart depicting a method in a second node according to some embodiments herein.

FIG. 4 is a schematic flowchart depicting a method in the second node, such as the radio base station 12, the LMU 13 or another radio base station, for performing a positioning measurement on at least uplink signals transmitted by the wireless device 10 served by a first node in the wireless communication network 1. The second node is exemplified as the LMU 13 and the first node is exemplified as the radio base station 12. The positioning node is exemplified as the positioning server 14. The wireless communication network 1 may comprise a multi-carrier system and at least one of said one or more uplink transmissions is on a secondary carrier. The actions do not have to be taken in the order stated below, but may be taken in any suitable order. Actions performed in some embodiments are marked with dashed boxes.

Action 401. The LMU 13 obtains information related to a non-contiguous uplink configuration associated with a carrier frequency. The non-contiguous uplink configuration further comprises one or more multi-cluster uplink transmissions from the wireless device 10. The information may further comprise any one or more of an uplink demodulation reference signal configuration, dynamic uplink grant information, and semi-persistent uplink grant information. The non-contiguous uplink configuration comprises non-adjacent uplink transmissions from at least two wireless devices. The non-contiguous uplink configuration may further comprise two or more uplink patterns for the wireless device 10, wherein the two or more uplink patterns are uplink transmission patterns or uplink measurement patterns. The at least one uplink pattern of the two or more uplink patterns may indicate no transmissions or no measurements. The information may in some embodiments further comprise one or more of: activation/deactivation status of an uplink transmission configuration, information related to time alignment status, HARQ feedback, and a retransmission configuration. The LMU 13 may obtain the information by receiving one or more of: a capability of the wireless device 10 to support non-contiguous transmissions, and a capability of the first node to support configuring non-contiguous transmissions. The information may be obtained in one or more of the ways: received from the wireless device 10; received from a network node; received via a third node, is a predefined configuration, acquired from a database/memory, and autonomously determined. The obtained information further comprises one or more of: a granted resource, a base sequence, a cyclic shift, an orthogonal cover code; a frequency resource, and a semi-static configuration parameter Action 402. The LMU 13 performs a positioning measurement on at least signals transmitted by the wireless device 10 in the one or more multi-cluster transmissions determined based on the obtained information.

Action 403. The LMU 13 performs Discontinuous Transmission, DTX, detection. This is advantageous in that the receiving node doing the measurements, such as the LMU 13, performs DTX detection to ensure that the signal is actually present.

Action 404. The LMU 13 may adapt receiver parameters based on the obtained information.

Action 405. The LMU 13 may transmit, to another node, the LMU's capability to perform non-contiguous measurements and/or capability of multi-pattern support.

Action 406. The LMU 13 may adjust measurement configuration based on capability to perform non-contiguous uplink measurements.

Figure 5:
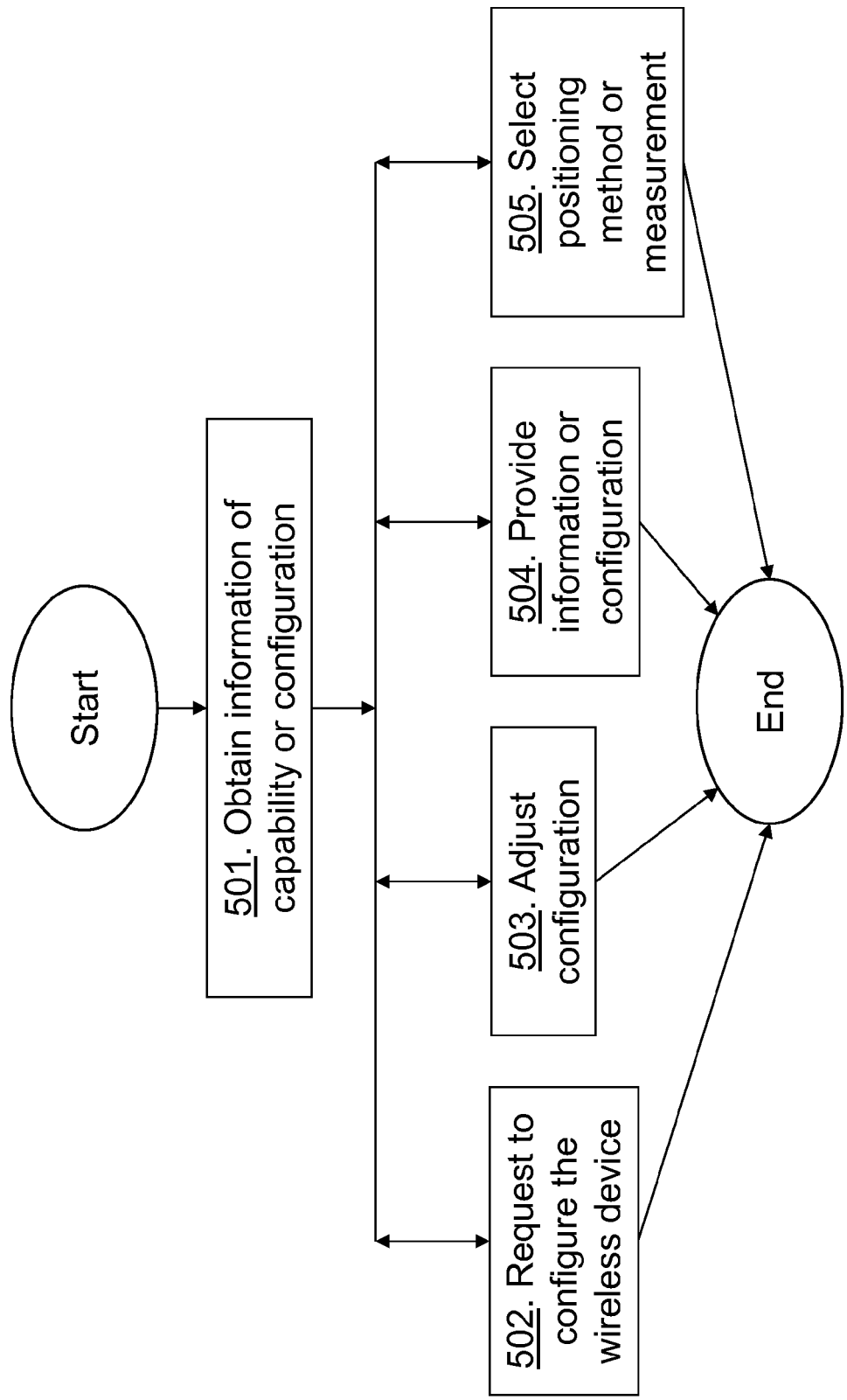
FIG. 5 shows a schematic flowchart depicting a method in a positioning node according to some embodiments herein.

FIG. 5 is a schematic flowchart depicting a method in a positioning node such as the positioning server 14 or the LMU 13, for handling information related to uplink transmissions from the wireless device 10 in the wireless communications network 1. The actions do not have to be taken in the order stated below, but may be taken in any suitable order.

Action 501. The positioning node obtains information related to: capability of supporting non-contiguous transmissions of the wireless device 10; non-contiguous configuration currently used by the wireless device 10; capability to perform non-contiguous uplink measurements of a measuring node; and/or capability to support two or more uplink patterns for the wireless device 10. The information is obtained in one or more of the ways: received from the wireless device 10; received from the measuring node; received from another node; from a predefined configuration; and associated with other information. A non-contiguous transmission may be a multi-cluster transmission. The capability and/or ability may be obtained from an uplink grant, by proactive reporting, by request from the positioning node or the wireless device 10. The information may be signalled to another node.

Action 502. The positioning node takes the obtained information into account when requesting another network node, such as the radio base station 12, serving the wireless device 10 to configure the wireless device 10 based on the obtained information.

Action 503. Additionally or alternatively, the positioning node takes the obtained information into account when adjusting configuration for performing a measurement. In some embodiments, the positioning node may adjust configuration by configuring transmissions or measurements for positioning the wireless device 10, to avoid interference to/from non-contiguous uplink transmissions or two or more uplink patterns for the wireless device 10.

Action 504. Additionally or alternatively, the positioning node takes the obtained information into account when providing to a measuring node, such as the LMU 13 or the radio base station 12, the wireless device configuration information or a measurement configuration.

Action 505. Additionally or alternatively, the positioning node takes the obtained information into account when selecting a positioning method and/or measurement configuration or measurement type based on the obtained information.

Solution 1: UL Positioning with Specific Scheduling Algorithms

Embodiments described for this solution may be used as a standalone solution or in any combination with any of Solutions 2-6, e.g., dynamic UL grants may be for non-cluster and/or for multi-cluster transmissions. This solution relates to actions 401 and 402 in FIG. 4. Further, the UL grants may be associated with the UL transmissions specifically configured for positioning or the transmissions that may be used for positioning. In another example, the UL grants may also be associated with multi-pattern configuration or pattern activation. In yet another example, the UL grants may be associated with one or more carriers, e.g., multi-carrier system with or without CA, or even one or more RATs; the grants for multiple carriers may also have pre-defined relation to reduce signaling overhead and allow for deriving the scheduling information on a second carrier from the grant information for a first carrier.

Method in Measuring Node, LMU 13, of Obtaining and Using Dynamic UL Grants for Performing Positioning Measurement According to this method the LMU 13 is made aware of dynamic UL transmissions of signals to enable it to perform positioning measurement on the UL DMRS. Here, the LMU 13 requires all information required to reconstruct the DMRS which are used to correlate with the received signal. To reconstruct DMRS the LMU 13 needs to know resource allocation, bandwidth and position in frequency domain, as well as the radio signal sequence used for the reference signals. In LTE, the radio signal sequence is determined partly by a base sequence and partly by a cyclic shift and orthogonal cover-code applied to the base sequence. While the base sequence can be derived from semi-statically configured parameters, and thus needs not to be signaled for each UL transmission, the PUSCH configuration is provided in PUSCH-Con fig section 6.3.2 in 36.331 v.11.0.0; and the Cell ID is also needed to determine the base sequence, the cyclic shift and orthogonal cover-code are part of the UL grant. To summarize, for each UL transmission the radio base station 12 needs to be informed about the used resources, resource block assignment and frequency hopping, as well as the cyclic shift and orthogonal cover-code of the DMRS. In addition also some semi-static configuration parameters need to be conveyed to the LMU 13. However, the required signaling overhead is much lower due to the static nature of this information. The LMU 13 may obtain this information, or configuration data, e.g.

- From the wireless device being positioned (e.g., via user-plane signaling) or
- From a network node, e.g., from the radio base station 12 via a proprietary interface or the positioning server 14 via SLmAP;
- As pre-defined configurations. For example one or more sets of UL transmission configurations can be pre-defined. In one embodiment, the wireless device 10 and/or network may also inform which of the pre-defined configuration is currently used by the wireless device 10, or activated.

Autonomously determined by the LMU 13 or another measuring node, e.g., based on measurements; e.g., autonomous DTX detection.

In the above, the obtaining the configuration data may also be via a third node, e.g. from the radio base station 12 or the wireless device 10 via the positioning server 14, where the third node may either relay/retransmit the configuration data without decoding it or may read the received configuration data and then create a message comprising at least some of the received configuration data for sending it to the LMU 13.

Even if the wireless device 10 is scheduled in the UL it might not receive, e.g., miss, the scheduling grant and therefore may not transmit anything; this event is called Discontinuous Transmission (DTX). Measurement on a non-existent signals substantially degrade positioning performance, it is therefore advantageous if the receiving node doing the measurements, such as the LMU 13, performs DTX detection to ensure that the signal is actually present. DTX detection may also be performed when there are multiple transmit patterns configured in the wireless device 10 but it is not known which one exactly is used.

If the radio base station 12 cannot correctly decode an UL transmission it typically sends a Non-Acknowledgement (NACK) on a Physical HARQ Indicator Channel (PHICH) to the wireless device 10. Since LTE UL uses a synchronous HARQ protocol, no further scheduling grants are issued to the wireless device 10 and the wireless device 10 will retransmit the packet using the same parameter as the original transmission 8 ms, for FDD, for TDD see Section 8 of 36.213 v.11.0.0., later. To enable the LMU 13 to measure on retransmissions it needs to be informed about the HARQ feedback.

To increase flexibility LTE specifies the possibility to overwrite the default synchronous HARQ behavior by an adaptive retransmission. In this case PHICH signals an Acknowledgement (ACK) but the radio base station 12 will request a retransmission of the same data via a new scheduling grant on PDCCH. Since the transmitted data are not of interest to the LMU 13 but only the DMRS, adaptive retransmissions can be treated by the LMU 13 as a normal transmission, i.e. it needs to know the granted resources, the base sequence, and the applied cyclic shift and orthogonal cover-code.

This embodiment provides the LMU 13 with most measurement possibilities but also requires the highest signaling overhead between the positioning server 14 and the LMU 13.

Even if above embodiments are described in terms of PDCCH and PHICH the newly defined control channels ePDCCH and ePHICH may be used as well.

The obtained information or configuration data related to dynamic UL grants is used by the LMU 13 for adapting its receiver parameters such that it can perform the positioning measurement, as stated in action 404 in FIG. 4, e.g. RTOA, more reliably. For example the LMU 13 may use the obtained information to determine or derive the signal transmission instances and signal characteristics, e.g. reference signal types, sequences, transmit time and/or frequency resources, etc, for performing measurements on signals transmitted by the wireless device 10. The derived signal transmission instances and signal characteristics are then used by the LMU 13 to adapt its receiver, select receiver type, and perform a positioning measurement.

Method in Measuring Node, Such as the LMU 13, Obtaining and Using Semi-Persistent UL Grants for Performing Positioning Measurement The LMU 13 needs to be informed about the semi-static configuration, the SPS configuration is provided in SPS-Config section 6.3.2 in 36.331, here mainly the periodicity is of interest; and in PUSCH-Config section 6.3.2 in 36.331, here mainly the parameters required to derive the base sequence are of interest; and the Cell-ID, also required to derive the base sequence, and the semi-persistent UL activation grant on PDCCH which indicates the frequency resources and the start of an semi-persistent session. The SPS session ends if the terminal does not use the semi-persistent resource a configured number of times in a row or if an SPS UL deactivation grant is received.

Also here DTX detection may be performed. A DTX event can either happen because the wireless device 10 misses the SPS UL activation grant starting an SPS session or because the wireless device 10 has nothing to transmit left and does not use the semi-persistent resource for a configured number of times in a row.

Another possibility for a DTX event on the semi-persistent resource is that the wireless device 10 is dynamically scheduled on another resource and dynamic scheduling overwrites SPS. If the LMU 13 is informed about dynamic scheduling decisions method above regarding dynamic UP grants applies. If the LMU 13 is not informed about dynamic scheduling decision the LMU 13 may perform DTX detection.

In the rare event that the Timing Advance Timer (TAT) of the UL expires from one to the next SPS transmission the wireless device 10 will stop transmitting. This can either be handled via DTX detection or that LMU 13 is informed about TAT status. Currently SPS is only defined for the PCell which cannot be deactivated. If SPS is also going to be specified for SCells which can be deactivated the activation status becomes of interest for the LMU 13 since the wireless device 10 does not transmit on deactivated carriers, see also Solution 2 below.

To summarize, the measuring node, e.g., LMU 13 or a neighbor radio base station, may need to be informed about SPS UL grants, the frequency resource, and some semi-static configuration parameters. Furthermore, TAT status and activation status might be of interest. The LMU 13 may obtain this information from the positioning server 14.

Embodiments herein provide the LMU 13 with fewer measurement possibilities than the solution regarding the dynamic UL grants, but embodiments herein also require a lower signaling overhead between positioning server 14 and the radio base station 12, e.g., LPPa, and/or the positioning server 14 and the LMU 13, e.g., SLmAP. The signaling overhead depends on how often SPS sessions are triggered.

Even if above embodiment is described in terms of PDCCH the newly defined control channel ePDCCH can be used as well. Furthermore, even though, the current 3GPP standard specifies SPS only for PCell, embodiments herein may also be applied to a multi-carrier semi-persistent UL transmission configuration in a general sense.

The LMU 13 may obtain this information or configuration data for semi-static UL grants, e.g., in one or more ways of the below:

From the wireless device 10 being positioned, e.g. via user-plane signaling;

From a network node, e.g., the radio base station 12 via a proprietary interface or the positioning server 14 via SLmAP;

Pre-defined configurations: for example one or more set of UL transmission configurations can be pre-defined. The wireless device 10 and/or network can inform which of the pre-defined configuration is currently used by the wireless device 10.

Autonomously determined by the LMU 13, e.g., based on measurements; e.g., autonomous DTX detection.

In the above, the obtaining the configuration data may also be via a third node, e.g., from the radio base station 12 or wireless device 10 via the positioning server 14, where the third node may either relay/retransmit the configuration data without decoding it or may read the received configuration data and then create a message comprising at least some of the received configuration data for sending it to the LMU 13.

The obtained information or configuration data related to semi-static UL grants is used by the LMU 13 for adapting its receiver parameters such that it can perform the positioning measurement, as stated in Action 404 in FIG. 4, e.g. RTOA, more reliably. For example the LMU 13 can use the obtained information to determine or derive the signal transmission instances and signal characteristics, e.g. reference signal types, sequences etc, for performing measurements on signals transmitted by the wireless device 10. The derived signal transmission instances and signal characteristics are then used by the LMU 13 to adapt its receiver, selecting receiver type, and perform a positioning measurement.

Solution 2: Methods of Facilitating Non-Contiguous UL Measurements for Positioning The embodiments described herein may be standalone or may be combined with embodiments described in any of Solutions 1, 3-6. This solution relates e.g. to actions 401-402 in FIG. 4.

A need for non-contiguous, in the frequency domain, UL measurements for positioning, the measurement performed by a measuring node, e.g. the LMU 13, may occur, e.g. due to any of:
  Non-contiguous UL transmissions from the wireless device 10, within the same band or the same component carrier or different bands or different component carriers;
  Parallel UL transmissions, non-adjacent in the frequency domain or with a separation larger than a threshold, e.g., more than N>0 resource blocks, in the frequency domain, from two or more wireless devices during the same time, e.g., same time resources or same time period comprising multiple time resources, where a resource may be a symbol, subframe, radio frame, etc.;
  A combination of the two above.

A non-contiguous UL transmission may comprise a multi-cluster transmission. A multi-cluster transmission herein may be an UL transmission of any UL radio signal/channel, e.g., a multi-cluster transmission of PUSCH, a multi-cluster transmission of SRS, or a multi-cluster transmission of DMRS.

A non-contiguous UL measurement may comprise a combination of non-contiguous blocks of frequency-domain resources used for UL measurements during the same time. In one example, each of some two of such blocks may comprise a different UL radio signal/channel transmission used for the UL measurement; and the two different UL transmissions may be transmitted by the same or different wireless device. A non-contiguous UL measurement may be of any type, like a normal UL measurement, e.g., a timing measurement, a received signal power measurement, etc.

According to some embodiments herein, non-contiguous UL measurement configuration configured in the LMU 13 may be based on the obtained information about the non-contiguous UL transmissions, the LMU's 13 capability to support non-contiguous measurements, transmit node's, such as the wireless device 10, capability to transmit non-contiguous transmissions, parallel measurement capability, etc. These data may be obtained in different ways, e.g., any one or a combination of: from another node; from a wireless device; may be pre-defined or based on a pre-defined rules applied in certain conditions; autonomously determined whether a pattern is used or whether a pattern is not used, e.g. determining based on measurements; autonomous or blind DTX.

Non-contiguous UL measurements may also be based on the obtained UL grant information, see e.g., Solution 1.

Methods in a Measuring Node, Such as the LMU 13 or the Radio Base Station 12.

According to some embodiments, a measuring node performing measurements for positioning, e.g, LMU 13 or a radio base station such as neighbor radio base station to the serving radio base station 12 of the wireless device 10 being positioned, is capable of performing non-contiguous UL measurements of at least one type described above. This capability data comprising at least the indication of that the measuring node is capable of performing non-contiguous UL measurements may be signaled to another node, e.g., the positioning server 14 or O&M or LMU gateway, see e.g. action 405 in FIG. 4. The capability may also comprise other information, e.g., any one or more of:
  Maximum number of blocks which, in another example, may be further associated with a Radio Frequency (RF) or system bandwidth;
  Minimum bandwidth of each block;
  Maximum gap between two blocks;
  Maximum number of bands or component carriers;
  Maximum number of wireless devices;
  UL radio signal type for which non-contiguous UL transmission or non-contiguous UL measurement is supported by the measuring node;
  Non-contiguous transmissions per each carrier in a single- or a multi-carrier configuration, e.g., 2 sets of 2 non-contiguous blocks each in two CCs for a wireless device in a CA system.

In one example, the capability may be comprised in a measuring node type or class. The capability may also be associated with a specific RF configuration since multi-cluster transmissions may require specific RF characteristics of the receiver, e.g., masks, Peak to Average Power Ratio (PARP) requirement, etc., e.g. due to different impact on the RF emissions.

A measuring node with or without non-contiguous UL measurement capability may, e.g.:
  adjust the received/requested measurement configuration, e.g., from another node such as from a positioning node, with respect to the node's capability or the node's current ability to configure the requested measurement, e.g., adopt the measurement configuration to the closest supported by the measuring node or currently possible for the node, e.g.,
    when the measuring node is congested, e.g. when a non-contiguous measurement is requested, the measuring node may select one contiguous block for performing measurements.

The measuring node with this capability may further do, e.g., any one or more of:
  Receive and serve UL measurement requests for non-contiguous UL measurements;
  Adjust it receiver configuration to perform the measurement, e.g., by selecting a first receiver type for performing a contiguous UL measurement and selecting a second receiver type for performing a non-contiguous UL measurement,
    in one example, the receiver configuration may comprise DFT and IFFT configuration;
  Adjust its RF configuration to meet the receiver RF requirements, e.g., sensitivity, PARP/cubic metric, etc.;
  Signal the capability information to another node,
    the capability may be indicated as a bitmap comprising indicators in a pre-defined order, e.g., associated with supported frequencies, bands, CCs, etc.;

Based on the capability, indicating that a certain requested non-contiguous UL measurement is not supported;

Perform one or more of non-contiguous UL measurements; the performed measurement may be further used internally by the measuring node and/or reported to another node, e.g., positioning node.

The measuring node with the non-contiguous UL measurement capability may also be required to meet different measurement requirements, e.g., measurement accuracy or measurement time, and/or RF requirements, depending on its capability to support non-contiguous UL measurements. The requirements may be tested with test equipment or network simulator implementing described embodiments or in a life network.

Methods in a Network Node

According to one embodiment, a network node, e.g., the positioning node such as the positioning server or the LMU 13, O&M, the radio base station 12, a coordinating or a gateway node, obtains the data related to the measuring node's, e.g., LMU or eNodeB, ability to perform non-contiguous UL measurements, see e.g. above and action 501 in FIG. 5. These data may be obtained in different ways, may be e.g.

- pre-defined e.g. by a standard,
- received from the measuring node,
- received from another node e.g. O&M or another positioning node, obtained by a predefined rule e.g. the measuring node should be able to support this if the UE supports non-contiguous UL transmissions or the network supports multi-cluster UL transmission scheduling,
- by associating this capability with another information about the measuring node e.g., supported bands, measuring node class, CA support, number of parallel UEs that can be measured, number of parallel UL measurements, etc,
- from the declared, by its vendor, configuration of the measuring node.

According to another embodiment, the network node may obtain the capability of the transmitting node, e.g. the wireless device 10, indicating its ability to transmit non-contiguous UL transmissions.

According to yet another embodiment, the network node may obtain the network's ability to configure non-contiguous UL transmissions, e.g., from the radio base station 12 or O&M.

According to yet another embodiment, the network node may receive non-contiguous UL transmission configuration configured in the transmitting node, e.g., in the wireless device 10 being positioned. In one example, this configuration information may be received from the radio base station 12 serving the wireless device 10.

Based on any of the embodiments above, e.g., different nodes' capability information related to non-contiguous UL measurements and/or non-contiguous UL transmission configuration may be obtained, the network node may further use this information in different ways, e.g., any one or more of:

- creating a measurement configuration which may further be sent to the measuring node, where the measurement configuration may comprise non-contiguous UL measurement configuration,
- extracting a contiguous transmission configuration e.g. selecting one of the contiguous blocks comprised in a non-contiguous transmission) from the non-contiguous transmission configuration and based on the extracted configuration configure a measurement for a measuring node,
- adopting non-contiguous UL measurement configuration to the measuring node's capability, based on the received non-contiguous UL transmission configuration,
- selecting one or more of measuring nodes for performing the necessary UL measurement e.g., selecting LMUs supporting measurements for multi-cluster transmissions based on their ability to support such measurements or selecting different sets of LMUs depending on whether the UL transmission configuration is contiguous or not,
- (re)selecting positioning method e.g., when no LMUs are available in the network or currently available for performing non-contiguous UL measurements.

Solution 3: Methods of Positioning with Multi-Pattern Configuration

The embodiments described herein may be standalone or may be combined with embodiments described in any of Solutions 1, 2, 4, 5. This solution relates e.g. to action 401 in FIG. 5.

Figure 6:
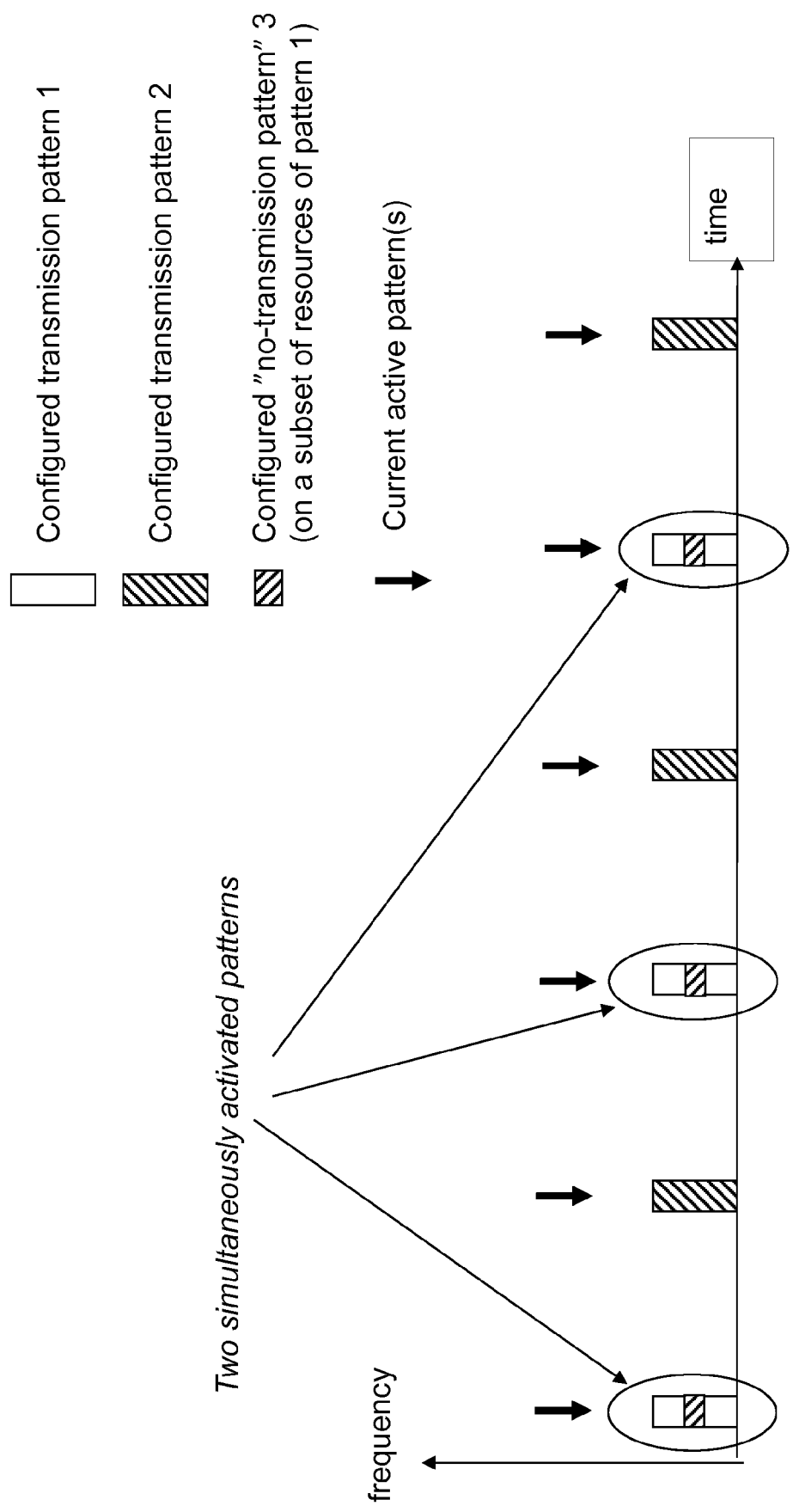
FIG. 6 shows a multi-pattern example.

According to one embodiment, multiple patterns may be simultaneously configured during positioning of one wireless device, e.g.:

- Two or more patterns may comprise two or more UL signal transmission patterns which may be configured simultaneously for the wireless device 10, but only N, e.g., N=1 or N=2 in one example, N=all_configured_patterns in another example, patterns may be active at a time, i.e., the UL transmissions may follow only one of the configured patterns at a time,
  - In a carrier aggregation system, the activation status of a pattern may also depend on the activation status of the corresponding CC;
- The two or more patterns may comprise two or more UL transmission patterns indicating time and/or frequency resources where UL signal transmission is configured to occur ("configured signal transmission pattern");
- The two or more patterns may also comprise a pattern indicating when UL signal transmission should not occur "no-transmission pattern", where the "no-transmission pattern" overlaps at least partly with the "configured signal transmission pattern" and hereby fully or partly deactivates one or more of the signals comprised in the "configured signal transmission pattern" during the time the "no-transmission pattern" is active, see e.g. FIG. 6. FIG. 6 shows a multi-pattern example showing three simultaneously configured patterns; one or two simultaneously active patterns, depending on the time instance.
- The two or more patterns may comprise two or more UL measurement patterns configured simultaneously, but at least N, e.g., N=1 or N=2 or N=all_configured_patterns, patterns may be used simultaneously for the performing an UL measurement for a wireless device.

In one example, a transmit pattern may be a SPS pattern.

Figure 7:
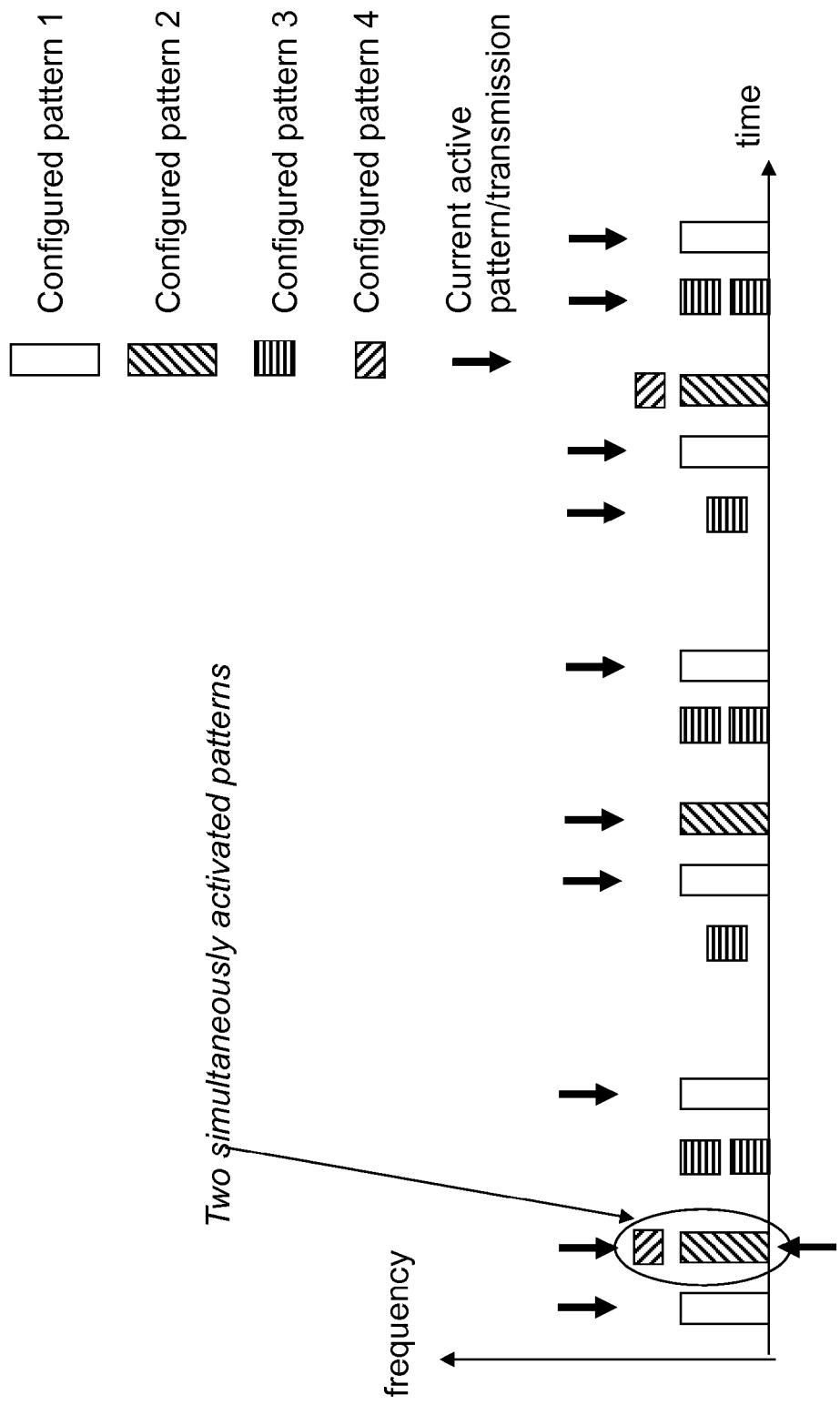
FIG. 7 shows a multi-pattern example.

In one embodiment, a pattern may also be associated with certain frequency resources e.g., carrier(s) in a multicarrier system or a subset of resource blocks within a channel bandwidth. In one example, the certain frequency resources may also be associated with the time resources and may be different at different time instances. The pattern may also comprise non-cluster and/or multi-cluster transmissions, see e.g. configured pattern 3 in FIG. 7. FIG. 7 shows a multi-pattern example showing four simultaneously configured patterns; one or two simultaneously active patterns, depending on the time instance.

The patterns may be configured and/or activated in one or more ways, e.g.
- configured by the serving eNodeB,
- configured by positioning node,
- configured by O&M,
- configured by wireless device, e.g., transmission pattern or "no-transmission pattern",
- configured by measuring node, e.g., measurement pattern,
- pre-defined or following a pre-defined rule in a certain condition,
- any combination of the above.

The configuring/activating may comprise e.g. pattern configuration and/or activation. The pattern configuration may comprise e.g. any one or more of: periodicity, bandwidth, frequency, number of transmissions, configuration index, duplex mode, (de)activation condition and/or applicable active time period, etc.

According to one embodiment, multiple patterns may be configured for UL positioning measurements. The measuring node may obtain the information about multiple patterns, where, in one example, the information may comprise the information about configured patterns and/or activated pattern configuration, e.g., periodicity of activation, and/or current activation status of a pattern, in different ways, e.g., by one or more of: From another network node or a wireless device; By a predefined rule, which may further be associated with one or more of conditions; Pre-defined and acquired from a database or internal or external memory; Based on the UL grant information (see e.g. Solution 1); Autonomously determined by the measuring node, e.g., based on measurements; e.g. DTX detection.

In a further embodiment, the node activating the pattern is not necessarily the node configuring the pattern. The number of activated patterns, may be pre-defined or configurable, e.g., adaptively to conditions and transmitting/configuring/measuring nodes' capabilities to support multiple patterns. The capability of multi-pattern support may be signaled to another node, e.g.: From measuring node to positioning node; From configuring node e.g., RBS 12 to positioning node; From transmitting node e.g., wireless node 10 to positioning node.

The activated pattern(s) may be selected based on, e.g.:
- Type of UL radio signal e.g., SRS, PUSCH, etc.;
- Measurement requirement or positioning Quality of Service (QoS);
- Interference conditions;
- Different measuring nodes availability;
- Measuring node capability to support multiple patterns;
- Transmitting node capability to support multiple patterns;
- Configuring node (e.g., eNodeB) capability to support multiple patterns;
- Configuring node's capability to configure/activate patterns upon a request from positioning node.

The two or more simultaneously configured patterns may have different periodicity.

In one example, the two or more patterns may comprise aperiodic SRS patterns. The aperiodic SRS, Type 1 SRS, is generally a one-short transmission, according to the current standard, however, in this invention, the serving eNodeB may activate SRS transmissions multiple time according to a pattern which may be viewed as an activated pattern and this pattern which will be followed by a sequence of multiple single-short SRS triggered by PDCCH/ePDCCH may be signaled to a measuring node. In this was a pattern may comprise a sequence of single-shot transmissions triggered individually.

The wireless device 10 may for example be configured with one pattern containing Type 0 SRS and one or multiple pattern containing one or multiple Type 1 SRS configurations. In this specific example, the measuring node can receive information which pattern is currently active via signaling or the measuring node may determine the active pattern itself: If a Type 1 SRS should be transmitted in the same subframe as a Type 0 SRS, the Type 0 SRS is dropped and the Type 1 SRS is transmitted. If the measuring node does not receive any information it performs DTX detection on Type 0 and Type 1 SRS resources and determines which SRS is currently transmitted. The information indicating the pattern containing Type 1 SRS is active is the trigger triggering a Type 1 SRS transmission. The trigger can be contained in UL grants but also in selected DL scheduling assignments.

Which pattern the wireless device 10 currently uses and/or if it transmits all signals according to the active pattern may also depend on the activation status of corresponding secondary DL cell. In case a DL cell is deactivated also the linked UL is deactivated. On a deactivated UL nothing—not even SRS—are transmitted. Also if the Timing Advance Timer (TAT) of an UL expires, the wireless device 10 will stop transmitting on this UL until the TAT is running again. To assist the measuring node in determining the activation status or TAT is makes sense to signal activation status and/or TAT of cells to the measuring node. Alternatively, the measuring node performs DTX detection.

Providing the measuring node with information to determine if SRS will be dropped assists the measuring node in determine which pattern is active and/or which signals of a pattern are transmitted. Typically SRS dropping can occur if it SRS collide with certain PUCCH transmissions. Providing the measuring node with PUCCH configuration information thus assists the measuring node in determine when SRS will be dropped.

This embodiment provides the measuring node e.g., LMU 13, with fewer measurement possibilities than the solution 1 but also requires a lower signaling overhead between the positioning server 14 and the radio base station 12 and/or the positioning server 14 and the measuring node.

Even if above embodiment is described in terms of PDCCH the newly defined control channel ePDCCH can be used as well.

Solution 4: Methods in Positioning Node of Obtaining UE Multi-cluster Capability The embodiments described in solution 4 may be standalone or may be combined with embodiments described in any of Solutions 1-3, 5, 6.

According to this embodiment, the positioning node, e.g. the positioning server 14, obtains information related to the capability of the wireless device 10 of supporting multi-cluster transmission or not. This solution relates e.g. to action 501 in FIG. 5.

Wireless Device Capability Information

The obtained capability information may indicate whether the UE supports multi-cluster transmission or not. The obtained information related to the UE multi-cluster transmission capability information may also comprise of additional information e.g.
- number of clusters per carrier, maximum size, e.g. resource blocks, of each cluster
- physical signals/channels involved in or applicable for multi-cluster transmission
- whether it is applicable to all frequency bands or only to specific frequency bands or band combinations
- whether it is applicable to all frequency bandwidths or only to specific frequency bandwidths or bandwidth combinations whether it is applicable only to single carrier transmission scenario or to multi-carrier transmission scenario or both whether it is applicable to all types of carrier aggregation or specific types of carrier aggregation e.g. only to inter-band CA whether it is applicable to any type of wireless device radio transmitter architecture or to a specific type of wireless device radio transmitter architecture e.g. only to multi-carrier wireless device with independent transmitter chains for each UL carrier applicable wireless device output power class(es) or wireless device output power class ranges e.g. only to 23 dBm wireless device or to any high power wireless device, e.g. 30 dBm or above, or to any power class, whether it is applicable to all or certain type of RF configurations of the wireless device.

The obtained multi-cluster transmission capability of the wireless device 10 may also comprise any one or more of the following two wireless device capabilities defined in TS 36.306:

multiClusterPUSCH-WithinCC: wireless device baseband support of multi-cluster PUSCH transmission within a component carrier, this is a band-agnostic capability, nonContiguousUL-RA-WithinCC-Info: wireless device RF support of non-contiguous UL resource allocations within a component carrier; this filed is signaled per E-UTRA radio frequency band and indicates in which bands the wireless device 10 supports non-contiguous wireless device resource allocation, the indicators are listed in the same order as in supportedBandListEUTRA.

Mechanism of Obtaining Wireless Device Capability

Any of the information related to the wireless device capability disclosed above can be obtained by the positioning node such as the positioning server 14 through implicit or explicit means or combination thereof.

Implicit Mechanism

According to this embodiment the positioning node use any implicit information related to a wireless device multi-cluster operation to determine whether the wireless device 10 is capable of multi-cluster transmission or not. For example if the positioning node is aware that the network node has been configured or is currently configured with a multi-pattern configuration parameters. The positioning node may determine the whether the multi-pattern configuration is used for the wireless device 10 or not based on information such as UL grant. The UL grant is sent by the serving node to the wireless device 10 for UL scheduling.

Explicit Mechanism

According to this embodiment, the positioning node obtains the wireless device information related to the wireless device multi-cluster transmission capability by receiving an explicit indication from the wireless device 10 and/or from a network node, which contains the wireless device capability information. Examples of network nodes are the radio base station 12, relay, base station, O&M, OSS, SON, MME, core network node etc. For example serving radio base station 12 may forward the wireless device capability information to the positioning node using LPPa. Similarly the wireless device 10 may send its capability to the positioning node using LPP.

The network node or the wireless device 10 may send the multi-cluster transmission capability information to the positioning node in any of the following manner:

Proactive reporting without receiving any explicit request from the positioning node, e.g. the positioning server 14.

For example whenever the wireless device 10 communicates with positioning node over LPP.

Reporting upon receiving any explicit request from the positioning node.

The explicit request can be sent by the positioning node to the network node and/or to the wireless device 10 anytime or at any specific occasion. For example the request can be sent when positioning request is triggered for determining the location of the wireless device 10 e.g. by the wireless device 10 and/or by the core network, e.g, MME.

In case of proactive reporting the wireless device 10 may also report its capability information during one or more of the following occasions:

During initial setup or call setup e.g. when establishing the RRC connection

During cell change e.g. handover, primary carrier change in multi-carrier operation, PCell change in multi-carrier operation, RRC re-establishment, RRC connection release with redirection etc.

Whenever it is configured by the serving node to operate in UL multi-cluster transmission.

Combined Mechanism

According to this embodiment the positioning node uses both implicit and explicit information related to the wireless device multi-cluster transmission to determine whether the wireless device 10 is capable of multi-cluster transmission or not. For example the positioning node may receive explicit indication from the network node and/or from the wireless device 10 to determine that the wireless device 10 supports multi-cluster transmission. The positioning node further uses implicit information e.g. UL grants to determine whether the wireless device 10 supports multi-cluster transmission when operating in single carrier or in multi-carrier or in both cases.

Action in Positioning Node Upon Obtaining Wireless Device Capability

The positioning node, such as the positioning server 14, upon obtaining the wireless device capability information related to multi-carrier transmission may use it for one or more purposes. This solution relates e.g. to actions 502-505 in FIG. 5.

For example the positioning node:

May store the obtained information and use it also in future operation. In this way the positioning node may not have to obtain this information again thereby reducing the signaling overheads.

The stored information may be further used for collecting the statistics about the wireless device 10 in the area, e.g., to determine the common device type or configuration, and configure one or more positioning procedures or measurements or allocation radio resources, adaptively to this statistics.

The stored information may be also used for RF fingerprinting and pattern matching The stored information may be stored together with the positioning performance characteristic for the corresponding device to enable positioning QoS estimation or prediction based on the device information and the collected statistics, which may be used e.g. for positioning method selection for the device.

May forward the obtained information to one or more measuring nodes, e.g. the LMU 13,) which may use the information for adapting its parameters related to the receiver which is used for performing the UL positioning measurements.

In one embodiment, the wireless device multi-cluster capability may be also taken into account when selecting measuring nodes for performing positioning measurements for the wireless device 10.

Requesting the network node, e.g. serving node of the wireless device 10, not to configure the wireless device 10 with multi-cluster/non-contiguous UL transmission.
  In one example, multi-cluster transmissions may be not configured for a specific positioning method or a specific measurement type.
  In another example, multi-cluster transmissions may be not configured if the expected positioning QoS for multi-cluster transmissions for this wireless device 10 or for a certain number, e.g., 90% or more than N, of wireless devices in an area is below a threshold
  The requesting embodiment may also be combined with Solution 2, e.g., positioning node being aware of that no LMUs or not sufficient number of LMUs with the non-contiguous measurement capability are available may request to not configure wireless devices with multi-cluster UL transmissions.

Requesting the network node, e.g. serving node of the wireless device 10, to configure the wireless device 10 with contiguous UL transmission i.e. non clustered transmission.
  In one example, contiguous UL transmissions may be configured for a specific positioning method or a specific measurement type.
  In another example, contiguous UL transmissions may be configured if the expected positioning QoS for contiguous transmissions for this wireless device 10 or for a certain number, e.g., 90% or more than N, of wireless devices in an area is above a threshold and/or if the expected QoS for multi-cluster UL transmissions is below a threshold.
  The requesting embodiment may also be combined with Solution 2, e.g., positioning node may decide to request to configure contiguous UL transmissions for UEs based on the measuring nodes' capability or availability for contiguous and/or multi-cluster transmisisons.

Requesting the network node, e.g. serving node of the wireless device 10, not to configure the wireless device 10 with multi-cluster/non-contiguous transmission when certain conditions are met e.g.:
  When wireless device UL signals are used for any positioning measurement e.g. RTOA, UE Rx-Tx time difference;
  When wireless device UL signals are used for any positioning measurement and when UL Bandwidth (BW) is below a threshold, e.g. 5 MHz;
  When the measurement bandwidth of one or more of measuring nodes is below a threshold
  When the applicable or desired measurement bandwidth of the measurement to be configured is below a threshold;
  When the transmission bandwidth of the wireless device 10 cannot be larger than a certain bandwidth, e.g., due to emission restrictions in the area, wireless device capability, serving cell's bandwidth, when higher power spectral density is desired, when the wireless device 10 is at a cell edge or at a certain distance from a measuring node, depending on the wireless device power class, etc.

Selecting measuring node adaptively to interference conditions for the target wireless device 10, taking into account wireless device multi-cluster capability Solution 5: Methods of Selecting Positioning Method Based on Wireless Device Multi-Cluster Capability and/or Multi-Pattern Configuration The embodiments described herein may be standalone or may be combined with embodiments described in Solutions 1-4, 6. This solution relates e.g. to action 505 in FIG. 5.

According to this embodiment the positioning node, such as the positioning server 14 or the LMU 13, may select a positioning method and/or positioning measurement based on criteria which is at least one of the obtained information related to the:
  wireless device multi-cluster transmission capability, and
  wireless device multi-cluster transmission configuration being used currently by the network and/or used by the wireless device 10.

The selection of positioning method and/or positioning measurement may also be based on specific information related to the above mentioned obtained information e.g.
  Type of multi-cluster transmission capability e.g. multi-cluster for PUSCH transmission within a carrier;
  Whether the wireless device 10 supports this for single carrier or multi-carrier transmission or both;
  Transmission bandwidth over which the wireless device 10 is configured to operate using the multi-cluster transmission.
  Frequency information, e.g. carrier frequency, bands etc, on which the wireless device 10 is using multi-cluster transmission.

In one example if the wireless device 10 is configured with multi-cluster transmission the positioning node may select a positioning method which requires only DL positioning measurements. Examples of positioning methods are using DL measurements are Observed Time Difference Of Arrival (OTDOA), Enhanced Cell ID (E-CID) etc. Examples of corresponding DL measurements are Reference Signal Received Power (RSRP), Reference Signal Received Quality (RSRQ), Reference Signal Time Difference (RSTD) etc. In yet another example the positioning node may select a positioning method which uses positioning measurement which is less sensitive to the multi-cluster transmission. For example the positioning node may use UE Rx-Tx time difference measurement instead of RTOA measurement for positioning. The former measurement is less sensitive than the latter measurement when the wireless device 10 transmits using multi-cluster configuration.

The positioning node may also take into account the capability of a measuring node, e.g. LMU 13, whether it is capable of performing positioning measurements, e.g. RTOA, on signals transmitted by the UE when it operates using multi-cluster transmission/non-contiguous transmission. For example if the measuring node is capable of performing positioning measurement on UL signals when the wireless device 10 operates using multi-cluster transmission/non-contiguous transmission then the positioning node may use UTDOA positioning method.

According to another embodiment if the measuring node, such as the LMU 13, is not capable of performing a positioning measurement when the wireless device 10 transmits using multi-cluster/non-contiguous transmission with sufficient reliability then the positioning node takes one or more of the following actions to improve reliability of wireless device location:
  Use a hybrid positioning method which uses more than one type of positioning measurement e.g. combine RTOA and E-CID measurements to determine wireless device position;

Do not request at least one measuring node to perform positioning measurement;

Requests measuring node to perform positioning measurement only when certain conditions are met e.g. when UL signal quality is above a threshold, e.g. SINR is above −3 dB, wireless device speed is below threshold, e.g. 10 km/h, radio conditions don't change too fast, e.g. Additive White Gaussian Noise (AWGN), slow fading etc;

May request measuring node to perform positioning measurement provided:
- transmission BW of UL signals transmitted by the wireless device 10 is above a threshold e.g. 5 MHz or larger;
- BW of the serving cell of the wireless device 10 is above a threshold e.g. 5 MHz or larger.

Solution 6: Interference Coordination for Positioning Purpose in a Network with Multi-Cluster Transmissions or Measurements Embodiments described herein may be combined with Solutions 1-5 or used as a standalone solution. Multi-cluster transmissions may be as defined in other solutions 1-5 or background section. This solution relates e.g. to action 503 in FIG. 5.

Figure 8:
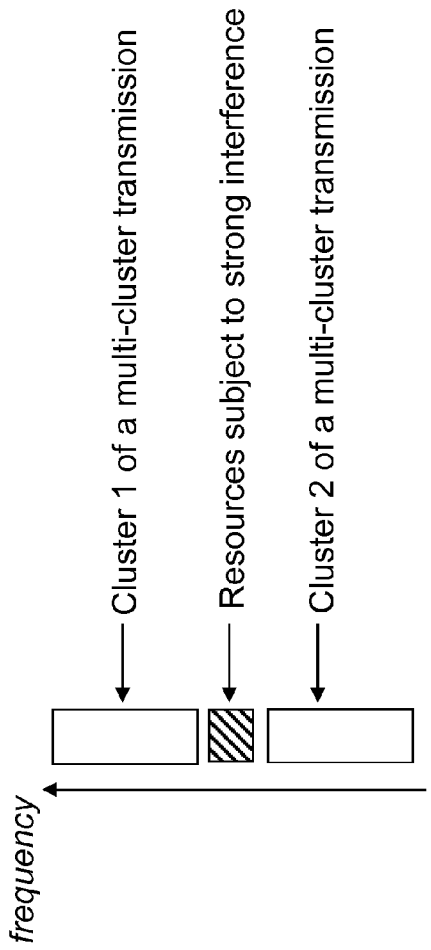
FIG. 8 shows an Interference-adaptive multi-cluster transmission.
Figure 9:
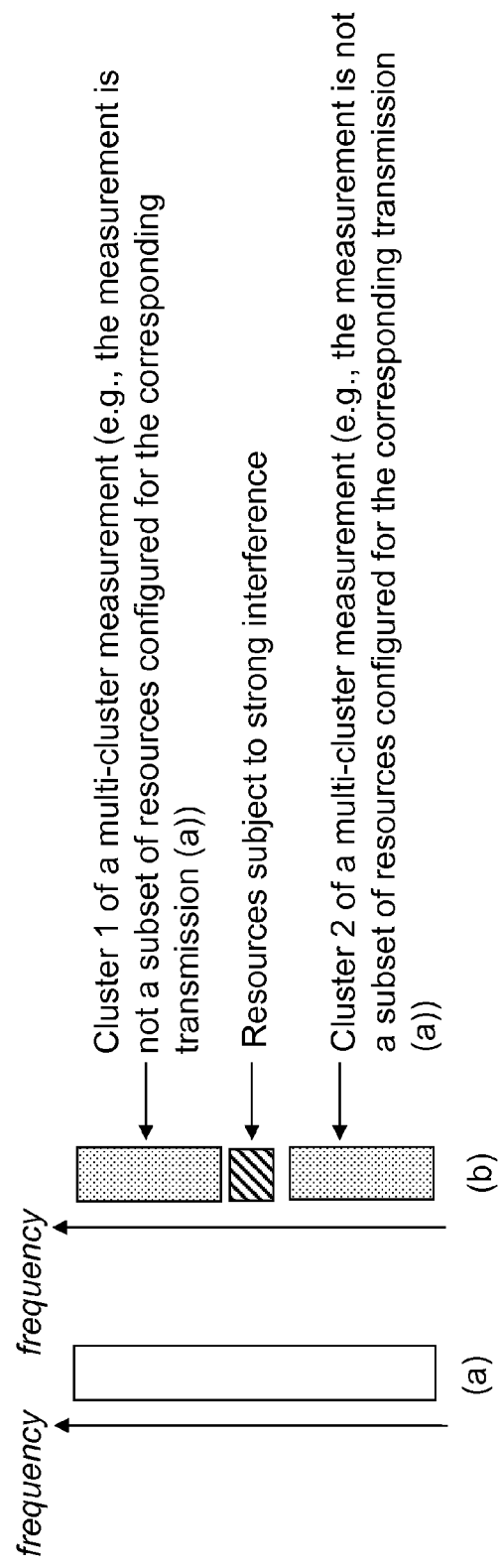
FIG. 9 shows an Interference-adaptive multi-cluster measurement (b) for a corresponding transmission (a)
Figure 10:
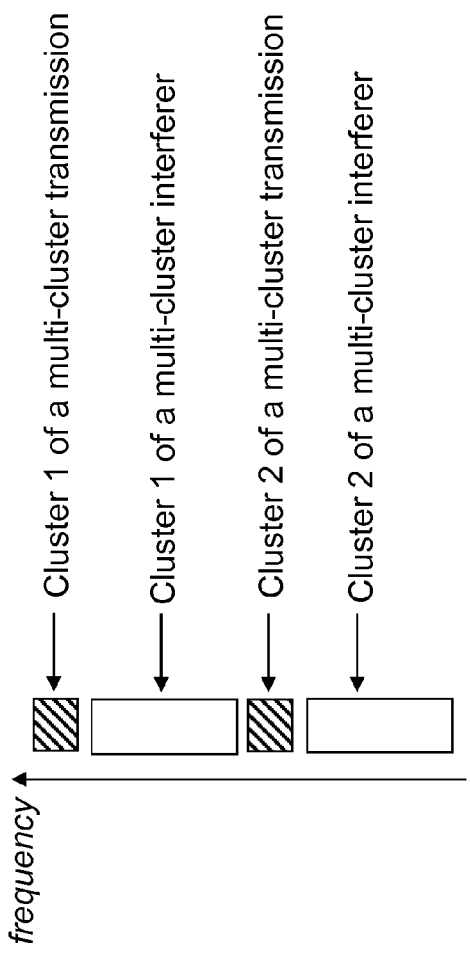
FIG. 10 shows an Interference-adaptive transmission with a multi-cluster interferer.
Figure 11:
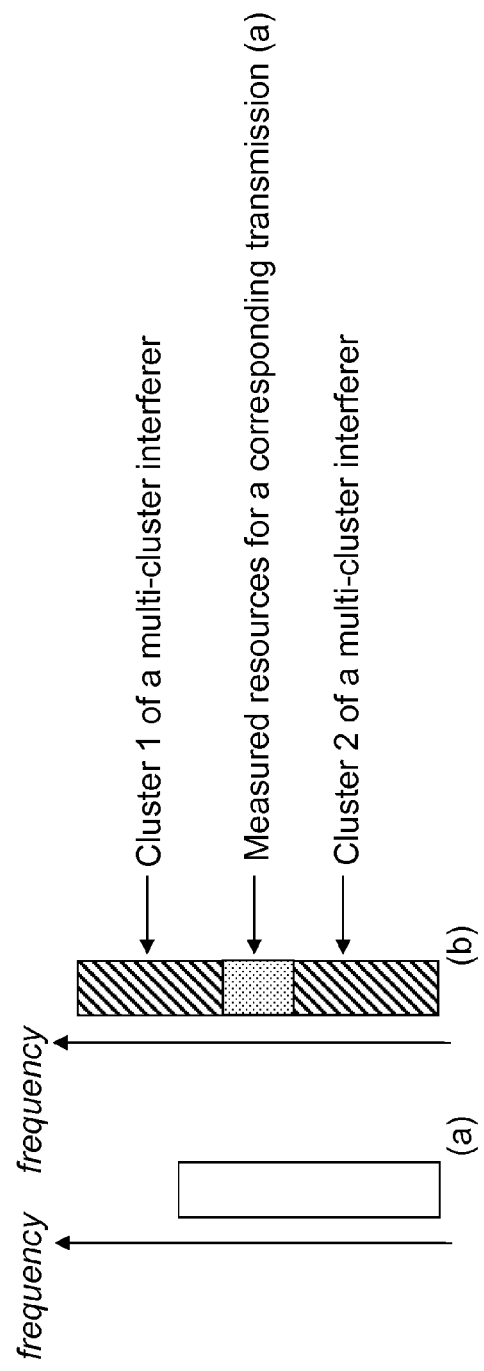
FIG. 11 shows an Interference-adaptive measurement (b) for a corresponding transmission (a)

According to this embodiment, interference coordination to facilitate positioning measurements in a network with multi-cluster transmissions may comprise, e.g.

configuring multi-cluster transmissions to avoid interference, e.g., not transmitting in frequency resources where the interference is high to prevent measurements on highly interfered resources, and the highly interfered resources are between the clusters)—see e.g. FIG. 8. FIG. 8 shows an Interference-adaptive multi-cluster transmission; or configuring multi-cluster measurements to avoid interference, e.g., not measuring and/or not transmitting in frequency resources where the interference is high, and the highly interfered resources are between the clusters, —see e.g. FIG. 9. FIG. 9 shows an Interference-adaptive multi-cluster measurement (b) for a corresponding transmission (a).

configuring transmissions to avoid interference from multi-cluster transmissions, e.g., transmitting in frequency resources between two clusters of an interfering multi-cluster transmission, —see e.g. FIG. 10. FIG. 10 shows an Interference-adaptive transmission with a multi-cluster interferer.

configuring measurements to avoid interference from multi-cluster transmissions, e.g., measuring in frequency resources between two clusters of an interfering multi-cluster transmission, —see e.g. FIG. 11. FIG. 11 shows an Interference-adaptive measurement (b) for a corresponding transmission (a).

configuring other transmissions to prevent interference to a multi-cluster transmission or measurement, configuring other multi-cluster transmissions to prevent interference to a transmission or measurement.

The interference coordination for one or more wireless devices may be performed, e.g., by any one or more of:

positioning node, such as the positioning server 14; by means of selecting measuring nodes and/or configuring measurements and/or requesting transmissions for one or more wireless devices;

measuring node such as the LMU 13: by adaptively configuring measurements for one or more wireless devices accounting for the interference information;

coordinating node such as a MME or similar: by performing one or more of: scheduling transmissions of the target, scheduling transmissions of interferers, configuring measurements of a target;

node configuring transmissions: by means of scheduling transmissions of a target, such as the radio base station 12;

node configuring transmissions: by means of scheduling transmissions of an interferer such as a neighbouring radio base station or the radio base station 12 serving a plurality of cells;

transmitting node e.g., by the radio base station 12: by adaptively configuring, transmitting and/or not transmitting configured transmissions.

The interference coordination may be further enhanced by signaling of the interference information or transmission scheduling information between relevant network nodes, e.g., the positioning server 14 and LMU 13, the positioning server 14 and the radio base station 12, neighbor radio base stations, the radio base station 12 and LMU 13, SON and the radio base station 12, SON and the positioning server 14, coordinating node and LMU 13, etc.)

exploiting the obtained scheduling information or transmission configuration for performing interference coordination, e.g.
- exploiting SRS transmission configuration received via LPPa by positioning server 14 from the radio base station 12 may be used by positioning server 14 to perform interference coordination e.g. by means of configuring measurements at LMUs and selecting LMUs;
- exploiting SRS transmission configuration received via SLmAP by LMU from E-SMLC may be used by LMU to perform interference coordination e.g. by means of configuring measurements at the LMU taking into account the SRS transmission configuration of the target wireless device 10 and/or interfering wireless device;
- adaptively to the obtained information, configuring at least one of: PUSCH, PUCCH, SRS or RACH transmissions of interfering wireless devices and hereby coordinate interference.

In the above, the interference information and scheduling information may comprise any one or more of:

transmission configuration for one or more wireless devices, e.g., a set of commonly used pattern-based resources for scheduling wireless devices in the cell; SRS subframe configuration used for all wireless devices in the cell [36.211], semi-persistent scheduling pattern for one or more wireless devices, interference pattern which comprise highly interfered resources, may comprise joining multiple transmit patterns for interfering wireless devices, measurement patterns used or preferred by measuring node, can be used to adaptively schedule interfering transmissions, interference level or an indication of interference severity, total interference and noise at a measuring node receiver, estimated or predicted, noise rise, estimated or predicted, load level, an indication of whether the resources, e.g., a measurement pattern, has specific interference conditions, e.g., low-interference subframes, Almost Blank Subframes (ABS) [TS 36.133], positioning subframes, Multicast-Broadcast Single Frequency Network (MBSFN) subframes, subframes with reduced power transmissions, low-activity subframes, etc.

Interference and measurement patterns herein may be used for one wireless device or more wireless devices in an area, e.g., a cell.

The interference coordination, e.g., interference-adaptive transmission configuration or measurement configuration or interferer scheduling, may be performed selectively for the wireless device 10 whose transmissions at a measuring node may be subject to strong interference, e.g., for a center-cell wireless device, for which the transmit power may be low due to power control, interfered by a nearby neighbor cell wireless device transmitting at a higher power, this wireless device may be further away from its serving cell, or for transmit power-limited cell-edge wireless devices. Note that positioning measurements may be more sensitive to interference since a transmitted signal may need to be detected at multiple sites which may be farther away than the serving cell.

In order to perform some of the disclosed methods herein a second node, such as the radio base station 12 or the LMU 13, is provided. FIG. 12 shows the second node. The second node is adapted to for performing a positioning measurement on at least uplink signals transmitted by the wireless device 10 served by a first node in the wireless communication network 1. The first node may be different than the second node. The wireless communication network 1 may comprise a multi-carrier system and at least one of said one or more uplink transmissions is on a secondary carrier.

The second node comprises an obtaining circuit 1201 configured to obtain information related to a non-contiguous uplink configuration associated with a carrier frequency. The non-contiguous uplink configuration further comprises one or more multi-cluster uplink transmissions from the wireless device 10. The information may further comprise any one or more of: an uplink demodulation reference signal configuration, dynamic uplink grant information, and semi-persistent uplink grant information. The non-contiguous uplink configuration may comprise non-adjacent uplink transmissions from at least two wireless devices. The non-contiguous uplink configuration may further comprise two or more uplink patterns for the wireless device 10. The two or more uplink patterns are uplink transmission patterns or uplink measurement patterns. The at least one uplink pattern of the two or more uplink patterns indicates no transmissions or no measurements. The information may in some embodiments further comprise one or more of: activation/deactivation status of an uplink transmission configuration, information related to time alignment status, HARQ feedback, and a retransmission configuration. In some embodiments the obtaining circuit 1201 is further configured to receive one or more of: a capability of the wireless device 10 to support non-contiguous transmissions, and a capability of the first node to support configuring non-contiguous transmissions. The information is obtained in one or more of the ways received from the wireless device 10, received from a network node, received via a third node, is a predefined configuration, acquired from a database/memory, and autonomously determined. The information may further comprise one or more of: a granted resource, a base sequence, a cyclic shift, an orthogonal cover code; a frequency resource, and a semi-static configuration parameter.

The second node further comprises a performing circuit 1202 configured to perform a positioning measurement on at least signals transmitted by the wireless device 10 in the one or more multi-cluster transmissions determined based on the obtained information.

The second node may further comprise a detection circuit 1203 configured to perform DTX detection.

The second node may further comprise an adapting circuit 1204 configured to adapt receiver parameters based on the obtained information.

The second node may further comprise a transmitting circuit 1205 configured to transmit, to another node, the second node's capability to perform non-contiguous measurements and/or capability of multi-pattern support.

The second node may further comprise an adjusting circuit 1206 configured to adjust measurement configuration based on capability to perform non-contiguous uplink measurements.

The embodiments herein for performing a positioning measurement may be implemented through one or more processors 1207 in the second node depicted in FIG. 12, together with computer program code for performing the functions and/or method actions of the embodiments herein. The program code mentioned above may also be provided as a computer program product, for instance in the form of a data carrier carrying computer program code for performing embodiments herein when being loaded into the second node. One such carrier may be in the form of a CD ROM disc. It is however feasible with other data carriers such as a memory stick. The computer program code may furthermore be provided as pure program code on a server and downloaded to the second node.

The second node may further comprise a receiving circuit 1208 configured to receive information, e.g. to obtain the information mentioned above, from a node.

The second node may also comprise a memory 1209 that may comprise one or more memory units and may be used to store for example data such as the obtained information, measurements, configurations, capabilities, receiver parameters, applications to perform the methods herein when being executed on the second node or similar.

In order to perform some of the disclosed methods herein a positioning node, such as the positioning server 14 or the LMU 13, is provided and is shown in FIG. 13. The positioning node is adapted for handling information related to uplink transmissions from the wireless device 10 in the wireless communications network 1.

The positioning node comprises an obtaining circuit 1301 configured to obtain information related to: capability of supporting non-contiguous transmissions of the wireless device 10; non-contiguous configuration currently used by the wireless device (0; capability to perform non-contiguous uplink measurements of a measuring node, such as the radio base station 12 or the LMU 13; and/or capability to support two or more uplink patterns for the wireless device 10. The information may be obtained in one or more of the ways: received from the wireless device 10, received from the measuring node, received from another node, from a predefined configuration, and associated with other information. A non-contiguous transmission is a multi-cluster transmission. The capability and/or ability may be obtained from an uplink grant, by proactive reporting, by request from the positioning node or the wireless device 10. The information may be signalled to another node.

The positioning node further comprises a performing circuit 1302 configured to take the obtained information into account when:
  requesting another network node serving the wireless device 10 to configure the wireless device 10 based on the obtained information;
  adjusting configuration for performing a measurement;
  providing to a measuring node the wireless device configuration information or a measurement configuration; and/or selecting a positioning method and/or measurement configuration or measurement type based on the obtained information.

In order to adjust configuration for performing the measurement, the performing circuit 1302 may be adapted to configure transmissions or measurements for positioning the wireless device 10, to avoid interference to/from non-contiguous uplink transmissions or two or more uplink patterns for the wireless device 10.

The embodiments herein for handling information related to uplink transmissions may be implemented through one or more processors 1303 in the positioning node depicted in FIG. 13, together with computer program code for performing the functions and/or method actions of the embodiments herein. The program code mentioned above may also be provided as a computer program product, for instance in the form of a data carrier carrying computer program code for performing embodiments herein when being loaded into the positioning node. One such carrier may be in the form of a CD ROM disc. It is however feasible with other data carriers such as a memory stick. The computer program code may furthermore be provided as pure program code on a server and downloaded to the positioning node.

The positioning node may further comprise a receiving circuit 1304 configured to receive information, e.g. to obtain the information mentioned above, from a node, and may also comprise a transmitting circuit 1305 configure to transmit information or configuration to other node.

The positioning node may also comprise a memory 1306 that may comprise one or more memory units and may be used to store for example data such as the obtained information, measurements, configurations, capabilities, positioning data, applications to perform the methods herein when being executed on the positioning node or similar.

The disclosure comprises several embodiments. Some example embodiments are as described below:

A first variant disclosed herein relates to a method in a node for instance a measuring node, e.g. the LMU 13, of performing a positioning measurement, the method comprises obtaining information related to UL grants, e.g. dynamic and semi-static UL grants, from any of the wireless device 10, network node, pre-defined configuration, or autonomously, determining or deriving the signal transmission instances and signal characteristics, e.g. reference signal types, sequences etc, for performing measurements on signals transmitted by the wireless device 10 and performing positioning measurement based on determined information Another variant disclosed herein relates to a method in a node, for instance a measuring node, e.g. the LMU 13, of performing a positioning measurement, the method comprises obtaining information related to the multiple signal patterns configured/actively used by the wireless device 10 and performing positioning measurement based on obtained information.

Another variant disclosed herein relates to a method in a node, for instance a measuring node, e.g. the LMU 13 of performing a positioning measurement, the method comprises: obtaining information related to a wireless device UL signal patterns which are configured/actively used by the wireless device 10, adjusting the receiver configuration used for performing positioning measurement, performing positioning measurement based on obtained information and/or adapted configuration.

Another variant disclosed herein relates to a method in a node for instance a positioning node, e.g. E-SMLC of managing a positioning of the wireless device 10, the method comprises: obtaining information related to wireless device capability of supporting multi-cluster/non-contiguous transmission and/or multi-cluster/non-contiguous configuration currently used by the wireless device 10. According to different variant the method may perform one or more of the following tasks based on obtained information: selecting a positioning method and/or positioning measurement depending upon whether the wireless device 10 is capable of multi-cluster/non-contiguous transmission and/or configured with multi-cluster/non-contiguous; forwarding the obtained information to the measuring node, e.g. the LMU 13; requesting a network node serving the wireless device 10 to configure the wireless device 10 for contiguous UL transmission.

According to further variants disclosed herein network nodes, for instance positioning nodes, comprising memory and processor adapted to perform any of the methods described are provided.

Other variants relates to methods and nodes for interference coordination.

Embodiments disclosed herein provide methods and apparatuses for improving position calculations by providing the LMU 13 with the possibility to perform frequent UL measurements. Several options are outlined ranging from UL measurement opportunities for every scheduled UL transmission, high signaling load, to fewer measurement opportunities by e.g. using semi-persistent scheduled UL transmissions, lower signaling load.

The methods and apparatuses disclosed herein enable the positioning node to be aware of wireless device capability and/or configuration in terms of multi-cluster/non-contiguous transmission. The positioning node use this information to enhance the wireless device positioning e.g. by selecting the most appropriate positioning measurements and/or positioning method.

The method enables the positioning node to ensure that wireless device UL transmission configuration is aligned with the measuring node capability in terms of supported UL transmission for performing a positioning measurement.

Of course, the present invention is not limited to the above-summarized features and advantages. Indeed, those skilled in the art will recognize additional features and advantages upon reading the following detailed description, and upon viewing the accompanying drawings.

Advantages of embodiments disclosed herein:
Embodiments herein provide methods for improving position calculations by providing e.g. the LMU 13 with the possibility to perform frequent UL measurements. Several options are outlined ranging from UL measurement opportunities for every scheduled UL transmission, high signaling load, to fewer measurement opportunities by e.g. using semi-persistent scheduled UL transmissions, lower signaling load.

Some methods enable the positioning node such as the positioning server 14 or the LMU 13, to be aware of UE capability and/or configuration in terms of multi-cluster/non-contiguous transmission. The positioning node uses this information to enhance the positioning of the wireless device 10 e.g. by selecting the most appropriate positioning measurements and/or positioning method.

Some methods enable the positioning node to ensure that UL transmission configuration of wireless device 10 is aligned with the measuring node capability in terms of supported UL transmission for performing a positioning measurement.

For purposes of illustration and explanation only, these and other embodiments are described herein in the context of operating in a radio access network (RAN) that communicates over radio communication channels with wireless terminals (also referred to as user equipment, or "UEs"). More particularly, specific embodiments are described in the context of systems using LTE as standardized by the membership of the 3rd Generation Partnership Project (3GPP). It will be understood, however, that possible embodiments are not limited to such embodiments and may be embodied generally in various types of communication networks. As used herein, the terms mobile terminal, wireless device, or UE can refer to any device that receives data from a communication network, and may include, but are not limited to, a mobile telephone ("cellular" telephone), laptop/portable computer, pocket computer, hand-held computer, and/or desktop computer.

Also note that the use of terminology such as "base station", which may be referred to in various contexts as NodeB, for example, and "wireless terminal," "mobile terminal," or "wireless device", often referred to as "UE" or "User Equipment", should be considering non-limiting and does not necessarily imply a certain hierarchical relation between two particular nodes of a communication link. In general, a base station, e.g., a "NodeB", and a wireless device, e.g., a "UE", may be considered as examples of respective different communications devices that communicate with each other over a wireless radio channel. While embodiments discussed herein may focus on wireless transmissions in an uplink from a NodeB to a UE, the disclosed techniques may also be applied, for example, to downlink transmissions in some contexts. As a result, several embodiments described in detail herein may be suitable for use in various wireless terminals, base stations, or both. It will be appreciated, of course, that the details of accompanying circuitry, including antennas, antenna interface circuits, radio-frequency circuits, and other control and base band circuits, will vary, depending on the specific application of the techniques disclosed herein. Because these details are not necessary to a complete understanding of the embodiments herein, those details are generally omitted in the discussion and in the accompanying figures.

A wireless device and UE are used interchangeably in the description. A UE may comprise any device equipped with a radio interface and capable of at least generating and transmitting a radio signal to a radio network node. Note that even some radio network nodes, e.g., a relay, an LMU, or a femto BS (aka home BS), may also be equipped with a UE-like interface, e.g., transmitting in UL and receiving in DL. Some example of "UE" that are to be understood in a general sense are PDA, laptop, mobile, sensor, fixed relay, mobile relay, any radio network node equipped with a UE-like interface, e.g., small RBS, eNodeB, femto BS, LMU.

A radio node is characterized by its ability to transmit and/or receive radio signals and it comprises at least a transmitting or receiving antenna, own or shared with another radio node. A radio node may be a UE or a radio network node. Some examples of radio nodes are a radio base station, e.g., eNodeB in LTE or NodeB in UTRAN, a relay, a mobile relay, Remote Radio Unit (RRU), Remote Radio Head (RRH), a sensor, a beacon device, a measurement unit, e.g., LMUs, user terminal, PDA, mobile, mobile phone, laptop, etc. A radio node may be capable of operating or receiving radio signals or transmitting radio signals in one or more frequencies, and may operate in single-RAT, multi-RAT or multi-standard mode, e.g., an example dual-mode user equipment may operate with any one or combination of WiFi and LTE or HSPA and LTE/LTE-A; an example eNodeB may be a dual-mode or Multi Standard Radio Base Station (MSR BS).

A measuring node is a radio node performing measurements on radio signals. Depending on the embodiments, the measuring node may perform measurements on DL signals, e.g., a wireless device or a radio network node equipped with a UE-like interface, relay, etc, or UL signals,e.g., a radio network node in general, eNodeB, WLAN access point, LMU, etc.

A radio network node is a radio node comprised in the RAN, unlike user terminals or mobile phones a radio network node, including eNodeB, RRH, LMU RRU, or transmitting-only/receiving-only nodes, may or may not create own cell and may comprise in some examples a transmitter and/or a receiver and/or one or more transmit antennas or one and/or more receive antennas, where the antennas are not necessarily co-located. It may also share a cell with another radio node which creates own cell. More than one cell may be associated with one radio node. Further, one or more serving cells, in DL and/or UL, may be configured for a UE, e.g., in a carrier aggregation system where a UE may have one Primary Cell (PCell) and one or more Secondary Cells (SCells).

A network node may be any radio network node or core network node. Some non-limiting examples of a network node are an eNodeB, RNC, positioning node, MME, PSAP, SON node, MDT node, (typically but not necessarily) coordinating node, and O&M node.

Positioning node described in different embodiments is a node with positioning functionality or a node performing positioning measurements, such as the LMU 13. For example, for LTE it may be understood as a positioning platform in the user plane, e.g., SLP in LTE, or a positioning node in the control plane, e.g., E-SMLC in LTE. SLP may also consist of Secure User Plane Location (SUPL) Location Centre (SLC) and SUPL Positioning Centre (SPC), where SPC may also have a proprietary interface with E-SMLC. Positioning functionality may also be split among two or more nodes, e.g., there may be a gateway node between LMUs and E-SMLC, where the gateway node may be a radio base station or another network node; in this case, the term "positioning node" may relate to E-SMLC and the gateway node. In a testing environment, a positioning node may be simulated or emulated by test equipment.

The term "coordinating node" used herein is a network and/or node, which coordinates radio resources with one or more radio nodes. Some examples of the coordinating node are network monitoring and configuration node, OSS node, O&M, MDT node, SON node, positioning node, MME, a gateway node such as Packet Data Network Gateway (P-GW) or Serving Gateway (S-GW) network node or femto gateway node, a macro node coordinating smaller radio nodes associated with it, eNodeB coordinating resources with other eNodeBs, etc.

The signaling described herein is either via direct links or logical links, e.g. via higher layer protocols and/or via one or more network and/or radio nodes. For example, signaling from a coordinating node may pass another network node, e.g., a radio network node.

The embodiments herein are not limited to LTE, but may apply with any RAN, single- or multi-RAT with or without carrier aggregation support. Some other RAT examples are LTE-Advanced, UMTS, HSPA, GSM, cdma2000, WiMAX, and WiFi.

An UL transmission or an UL radio signal herein is in general any radio signal transmission by the wireless device, wherein the transmission may be a dedicated or directed transmission towards a specific node (e.g., eNodeB, LMU, another wireless device, relay, repeater, etc.) or a multicast or a broadcast transmission transmitted by the wireless device. In some examples, an UL transmission may even be a peer-to-peer transmission or device-to-device communication, when the transmission is by a wireless device and/or in a frequency spectrum (e.g., frequency band or carrier) intended for UL transmissions. Some examples of UL radio signals are reference signals transmitted by the wireless device (e.g., SRS or demodulation reference signals transmitted in UL), dedicated or shared channels transmitted by the wireless device (e.g., data channels, control channels, random access channel, a broadcast channel transmitted by the wireless device, etc.), or other physical signals (e.g., transmitted by the wireless device to support device-to-device communication such as for neighbor discovery or presence/activity indication or transmitting a beacon signal/message). UL radio signals in the embodiments described herein may or may not be configured specifically for positioning and may or may not be used for positioning measurements.

The term "UL measurement" herein refers to a measurement performed on one or more UL radio signals described above. In general, an UL measurement is a measurement involving at least one UL component, where a measurement may comprise one or more of: a physical-layer measurement and a physical channel reception. One radio measurement may comprise sampling one or more radio signal samples, e.g., different samples may be comprised in different time and/or frequency resources. Such measurements may be timing measurements, power-based measurements, direction measurements, etc., which may be performed for any purpose—see also the corresponding background section for existing measurements. Some specific examples of UL measurements, involving at least one UL component, are a measurement on multifurious links disclosed in PCT/SE2012/050644 included herein by reference and a composite measurement disclosed in U.S. 61/678,462 included herein by reference, UL TDOA or TOA measurement, UL AoA, UE Rx-Tx, eNodeB Rx-Tx, UL received signal strength or quality, UL pathloss measurement, any radio network node (e.g., eNodeB or LMU) measurement described in 3GPP TS 36.214, etc. The measurement with at least one UL component may involve radio links between two or more radio nodes, e.g., three radio nodes may be involved with multifarious links or TDOA measurements, and the radio links may or may not be on the same frequency, same CC, same frequency band, or same RAT.

In some embodiments, UL positioning measurements are described. Herein, the following terms may be used interchangeably: UL measurements used for positioning, measurements used for UL positioning, and UL positioning measurements, and comprise any radio measurement which may be performed on radio signals configured for positioning or other purpose and wherein the measurements are used at least for positioning. The term UL positioning at least in some embodiments may refer e.g. to UTDOA. Further, UL positioning measurements may comprise, e.g., UL RTOA, but may also be any of the following: UL TOA, UL TDOA, UL AoA, UL power-based measurement (e.g., UL received signal quality or UL received signal strength measurement), UL propagation delay, a two-directional measurement involving an UL measurement component (e.g., RTT, eNodeB Rx-Tx or UE Rx-Tx), or any positioning measurement in general involving at least one UL measurement component.

Semi-persistent scheduling and semi-persistent resource allocation generally refers herein to scheduling transmissions in a non-dynamic nature, i.e., where the allocated frequency resources are intended to be used repeatedly according to a certain pattern. A specific example is semi-persistent scheduling specified in 3GPP (see, e.g., 3GPP TS 36.300, 36.212, and 36.331).

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing circuits discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the present invention is limited only by the following claims and their legal equivalents.

Abbreviations

3GPP $3^{rd}$ Generation Partnership Project
ABS Almost Blank Subframes
ARQ Automatic Repeat Request
BS Base Station
CRS Cell-specific Reference Signal
DCI Downlink Control Information
DL Downlink
DMRS Demodulation reference Signals
eNodeB evolved Node B
ePDCCH enhanced PDCCH
E-SMLC Evolved SMLC
IE Information Element
LCS Location Services
LTE Long-Term Evolution
MDT Minimization of Drive Tests
PCI Physical Cell Identity
PCell Primary Cell
PDCCH Physical Downlink Control Channel
PHICH Physical Hybrid-ARQ Indicator Channel
RF Radio Frequency
RRC Radio Resource Control
RSRP Reference Signal Received Power
RSRQ Reference Signal Received Quality
RSSI Received Signal Strength Indicator
SINR Signal-to-Interference Ratio
SON Self-Optimized Network
SPS Semi-persitetent Scheduling
SRS Sounding Refence Signals
TAT Timing Advance Timer
UE User Equipment
UL Uplink
UL RTOA UL Relative Time of Arrival
UMTS Universal Mobile Telecommunications System
UTDOA UL Time Difference of Arrival

What is claimed is:

1. A method in a second node for performing a positioning measurement on at least uplink signals transmitted by a wireless device served by a first node in a wireless communication network, comprising:
   obtaining information related to a non-contiguous uplink configuration associated with a carrier frequency, wherein the non-contiguous uplink configuration further comprises one or more multi-cluster uplink transmissions from the wireless device; and
   performing a positioning measurement on at least signals transmitted by the wireless device in the one or more multi-cluster transmissions determined based on the obtained information.

2. A method according to claim 1, wherein the information further comprises any one or more of:
   an uplink demodulation reference signal configuration,
   dynamic uplink grant information, and
   semi-persistent uplink grant information.

3. A method according to claim 1, wherein the non-contiguous uplink configuration comprises non-adjacent uplink transmissions from at least two wireless devices.

4. A method according to claim 1, wherein the non-contiguous uplink configuration further comprises two or more uplink patterns for the wireless device, wherein the two or more uplink patterns are uplink transmission patterns or uplink measurement patterns.

5. A method according to claim 4, wherein at least one uplink pattern of the two or more uplink patterns indicates no transmissions or no measurements.

6. A method according to claim 1, wherein the information further comprises one or more of: activation/deactivation status of an uplink transmission configuration, information related to time alignment status, Hybrid Automatic Repeat Request, HARQ, feedback, and a retransmission configuration.

7. A method according to claim 1, wherein the wireless communication network comprises a multi-carrier system and at least one of said one or more uplink transmissions is on a secondary carrier.

8. A method according to claim 1, wherein the obtaining the information further comprises receiving one or more of: a capability of the wireless device to support non-contiguous transmissions, and a capability of the first node to support configuring non-contiguous transmissions.

9. A method according to claim 1, wherein the information is obtained in one or more of the ways:
   received from the wireless device,
   received from a network node,
   received via a third node,
   is a predefined configuration,
   acquired from a database/memory, and
   autonomously determined.

10. A method according to claim 1, further comprising performing Discontinuous Transmission, DTX, detection.

11. A method according to claim 1, wherein the information further comprises one or more of: a granted resource, a base sequence, a cyclic shift, an orthogonal cover code; a frequency resource, and a semi-static configuration parameter.

12. A method according to claim 1, further comprising adapting receiver parameters based on the obtained information.

13. A method according to claim 1, further comprising transmitting to another node, the second node's capability to perform non-contiguous measurements and/or capability of multi-pattern support.

14. A method according to claim 1, further comprising adjusting measurement configuration based on capability to perform non-contiguous uplink measurements.

15. A method in a positioning node for handling information related to uplink transmissions from a wireless device in a wireless communications network, comprising:
   obtaining information related to a non-contiguous transmission configuration currently used by the wireless device; and
   taking the obtained information into account when performing at least one of the following: requesting another network node serving the wireless device to configure the wireless device based on the obtained information; adjusting configuration for performing a measurement, wherein the adjustinq configuration comprises configuring transmissions or measurements for positioning the wireless device, to avoid interference to/from non-contiguous uplink transmissions or two or more uplink patterns for the wireless device; providing to a measuring node the wireless device configuration information or a measurement configuration; and selecting at least one of a positioning method, measurement configuration and measurement type based on the obtained information.

16. A method according to claim 15, wherein the information is obtained in one or more of the ways:
   received from the wireless device,
   received from the measuring node,
   received from another node,
   from a predefined configuration, and
   associated with other information.

17. A method according to claim 15, wherein a non-contiguous transmission is a multi-cluster transmission.

18. A method according to claim 15; wherein the information is signalled to another node.

19. A second node for performing a positioning measurement on at least uplink signals transmitted by a wireless device served by a first node in a wireless communication network, the second node comprising:
   an obtaining circuit configured to obtain information related to a non-contiguous uplink configuration associated with a carrier frequency, wherein the non-contiguous uplink configuration further comprises one or more multi-cluster uplink transmissions from the wireless device; and
   a performing circuit configured to perform a positioning measurement on at least signals transmitted by the wireless device in the one or more multi-cluster transmissions determined based on the obtained information.

20. A second node according to claim 19, wherein the information further comprises any one or more of:
   an uplink demodulation reference signal configuration,
   dynamic uplink grant information, and
   semi-persistent uplink grant information.

21. A second node according to claim 19, wherein the non-contiguous uplink configuration comprises non-adjacent uplink transmissions from at least two wireless devices.

22. A second node according to claim 19, wherein the non-contiguous uplink configuration further comprises two or more uplink patterns for the wireless device, wherein the two or more uplink patterns are uplink transmission patterns or uplink measurement patterns.

23. A second node according to claim 22, wherein at least one uplink pattern of the two or more uplink patterns indicates no transmissions or no measurements.

24. A second node according to claim 19, wherein the information further comprises one or more of: activation/deactivation status of an uplink transmission configuration, information related to time alignment status, Hybrid Automatic Repeat Request, HARQ, feedback, and a retransmission configuration.

25. A second node according to claim 19, wherein the wireless communication network comprises a multi-carrier system and at least one of said one or more uplink transmissions is on a secondary carrier.

26. A second node according to claim 19, wherein the obtaining circuit is further configured to receive one or more of: a capability of the wireless device to support non-contiguous transmissions, and a capability of the first node to support configuring non-contiguous transmissions.

27. A second node according to claim 19, wherein the information is obtained in one or more of the ways:
 received from the wireless device,
 received from a network node,
 received via a third node,
 is a predefined configuration,
 acquired from a database/memory, and
 autonomously determined.

28. A second node according to claim 19, further comprising
 a detection circuit configured to perform Discontinuous Transmission, DTX, detection.

29. A second node according to claim 19, wherein the information further comprises one or more of: a granted resource, a base sequence, a cyclic shift, an orthogonal cover code; a frequency resource, and a semi-static configuration parameter.

30. A second node according to claim 19, further comprising
 an adapting circuit configured to adapt receiver parameters based on the obtained information.

31. A second node according to claim 19, further comprising
 a transmitting circuit configured to transmit, to another node, the second node's capability to perform non-contiguous measurements and/or capability of multi-pattern support.

32. A second node according to claim 19, further comprising
 an adjusting circuit configured to adjust measurement configuration based on capability to perform non-contiguous uplink measurements.

33. A positioning node for handling information related to uplink transmissions from a wireless device in a wireless communications network, the positioning node comprising:
 an obtaining circuit configured to obtain information related to a non-contiguous transmission configuration currently used by the wireless device; and
 a performing circuit configured to take the obtained information into account when performing at least one of the following: requesting another network node serving the wireless device to configure the wireless device based on the obtained information; adjusting configuration for performing a measurement, wherein the adjusting configuration comprises configuring transmissions or measurements for positioning the wireless device, to avoid interference to/from non-contiquous uplink transmissions or two or more uplink patterns for the wireless device; providing to a measuring node the wireless device configuration information or a measurement configuration; and selecting at least one of a positioning method, measurement configuration and measurement type based on the obtained information.

34. A positioning node according to claim 33, wherein the information is obtained in one or more of the ways:
 received from the wireless device,
 received from the measuring node,
 received from another node,
 from a predefined configuration, and
 associated with other information.

35. A positioning node according to claim 33, wherein a non-contiguous transmission is a multi-cluster transmission.

36. A positioning node according to claim 33; wherein the information is signalled to another node.

37. A method in a second node for performing a positioning measurement on at least uplink signals transmitted by a wireless device served by a first node in a wireless communication network, comprising:
 obtaining information related to non-contiguous uplink transmissions of the wireless device, wherein the non-contiguous uplink transmissions are associated with a carrier frequency and comprise at least two non-contiguous blocks of uplink signals in frequency domain; and
 performing a positioning measurement on at least signals transmitted by the wireless device in the at least two non-contiguous blocks of uplink signals in the frequency domain.

38. A second node for performing a positioning measurement on at least uplink signals transmitted by a wireless device served by a first node in a wireless communication network, the second node comprising:
 at least one processor; and,
 at least one memory that stores processor-executable instructions, wherein the at least one processor interfaces with the at least one memory to execute the processor-executable instructions, whereby said second node is operable to:
 obtain information related to non-contiguous uplink transmissions of the wireless device, wherein the non-contiguous uplink transmissions are associated with a carrier frequency and comprise at least two non-contiguous blocks of uplink signals in frequency domain; and
 perform a positioning measurement on at least signals transmitted by the wireless device in the at least two non-contiguous blocks of uplink signals in the frequency domain.

* * * * *